US012093589B2

(12) United States Patent
Kanamoto et al.

(10) Patent No.: US 12,093,589 B2
(45) Date of Patent: Sep. 17, 2024

(54) INFORMATION PROCESSING APPARATUS AND CONTROL METHOD FOR THE SAME

(71) Applicant: CANON KABUSHIKI KAISHA, Tokyo (JP)

(72) Inventors: Yoshiji Kanamoto, Tokyo (JP); Kimio Hayashi, Tokyo (JP); Toshihiko Iida, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/045,062

(22) Filed: Oct. 7, 2022

(65) Prior Publication Data

US 2023/0109812 A1 Apr. 13, 2023

(30) Foreign Application Priority Data

Oct. 12, 2021 (JP) ............................. JP2021-167323

(51) Int. Cl.
*G06F 3/12* (2006.01)

(52) U.S. Cl.
CPC .......... *G06F 3/1275* (2013.01); *G06F 3/1203* (2013.01)

(58) Field of Classification Search
CPC .... G06F 3/1203; G06F 3/1275; G06F 3/1207; G06F 3/1259; G06F 3/126; G06F 3/1268; G06F 3/1282; G06F 3/1205
See application file for complete search history.

(56) References Cited

U.S. PATENT DOCUMENTS 7,349,638 B2 * 3/2008 Mima ................ G03G 15/5083 399/24
9,507,546 B2 * 11/2016 Rajalingam ........... G06F 3/1241
2002/0046129 A1 * 4/2002 Nakagawa ............. G06Q 30/06 705/26.8
2008/0201236 A1 * 8/2008 Field .................... G06Q 10/087 705/26.8

FOREIGN PATENT DOCUMENTS

JP 2004213378 A 7/2004

* cited by examiner

*Primary Examiner* — John R Wallace
(74) *Attorney, Agent, or Firm* — Canon U.S.A., Inc. IP Division

(57) ABSTRACT

An information processing apparatus includes a receiving unit configured to receive order data for a printed product, and content data for the order data, and a control unit configured to perform control in such a manner as to perform production of the printed product. The order data for the printed product and the content data for the order data are received at different timings. The receiving unit further receives finalized information about the content data. The control unit performs control in such a manner as to perform production of the printed product based on the order data, the content data and the finalized information.

11 Claims, 22 Drawing Sheets

| | |
|---|---|
| BOOT LOADER | ~401 |
| OPERATING SYSTEM | ~402 |
| NETWORK CONTROL PROGRAM | ~403 |
| WEB SYSTEM | ~404 |
| ORDER RECEIPT INFORMATION MANAGEMENT PROGRAM | ~405 |
| CONTENT DATA HOLDING PROGRAM | ~406 |
| JDF ANALYSIS PROGRAM | ~407 |
| SECOND RECEIVING PROGRAM | ~408 |
| THIRD RECEIVING PROGRAM | ~409 |
| THIRD TRANSMISSION PROGRAM | ~410 |
| WORKFLOW CONTROL PROGRAM | ~411 |
| PREPRESS PROGRAM | ~412 |
| PRODUCTION MANAGEMENT PROGRAM | ~413 |

```
<PurchaseOrder TimeStamp="2021-01-14T11:30:00+0900"
QuoteID="XXXXX" BuisinessID="YYYYY" PrintProviderName="BBB Printer"
BuyerName="AAA00000">

<xjdf:XJDF JobID="item1" Types="Product">
<xjdf:ProductList>
<xjdf:ProductAmount="5000000" DescriptiveName="Magazine_id_2021_22193390"
    Surface="Coating" Dimension="1191 842" Pages="184" Sides="TwoSidedFlipY"
        ...
    />
</xjdf:ProductList>
</xjdf:XJDF>

</PurchaseOrder>
```

901

902

805

```
<PurchaseOrderResponse TimeStamp="2021-01-14T12:30:00+0900"
 RefID="YYYYY" PrintProviderName="BBB Printer" BuyerName="AAA00000"
 OrderStatus="Accepted">

<Comment>
Thank you for always using our company.
</Comment>

</PurchaseOrder>
```

```
<ContentDelivery TimeStamp="2021-01-15T13:30:00+0900"
BuisinessID="YYYYY" PrintProviderName="BBB Printer" BuyerName="AAA00000"
UpdateMethod="Add" Finalized="True">

<xjdf:XJDF JobID="item1" Types="Product Delivery">
<xjdf:ResourceSet Name="RunList" Usage="Input">
<xjdf:Resource>
<xjdf:RunList>
<xjdf:FileSpec MimeType="Application/pdf" URL="file:///Contnt3.pdf"/>
</xjdf:RunList>
</xjdf:Resource>
</xjdf:ResourceSet>
</xjdf:XJDF>

</ContentDelivery>
```

904
908
905
519

808

```
<ContentDeliveryResponse TimeStamp="2021-01-15T13:45:00+0900"
 RefID="YYYYY" PrintProviderName="BBB Printer" BuyerName="AAA00000"
 Result="accepted">

<xjdf:XJDFJobID="item1" File="Content3.pdf" >
<xjdf:ResourceSetName="AuditPool">
<xjdf:Resource>
<xjdf:AuditPool>
<xjdf:PreFlightReportResult="success">
</xjdf:AuditPool>
</xjdf:Resource>
</xjdf:ResourceSet>
</xjdf:XJDF>

</ContentDelivery>
```

```
<ContentDelivery TimeStamp="2021-01-15T13:50:00+0900"
BuisinessID="YYYYY" PrintProviderName="BBB Printer" BuyerName="AAA00000"
UpdateMethod="Replace" Finalized="False">~910

<xjdf:XJDF JobID="item1" Types="Product Delivery">
<xjdf:ResourceSet Name="RunList" Usage="Input">
<xjdf:Resource>
<xjdf:RunList>
<xjdf:FileSpec MimeType="Application/pdf" URL="file:///Contnt3.pdf"/>~519
</xjdf:RunList>
</xjdf:Resource>
</xjdf:ResourceSet>
</xjdf:XJDF>

</ContentDelivery>
```

908

905

811

```
<ContentDeliveryResponse TimeStamp="2021-01-15T13:51:00+0900"
 RefID="YYYYY" PrintProviderName="BBB Printer" BuyerName="AAA00000"
 Result="Rejected" >~911

<Reason>
    Additional content data upload and replacement cannot be approved.
</Reason>

</ContentDelivery>
```

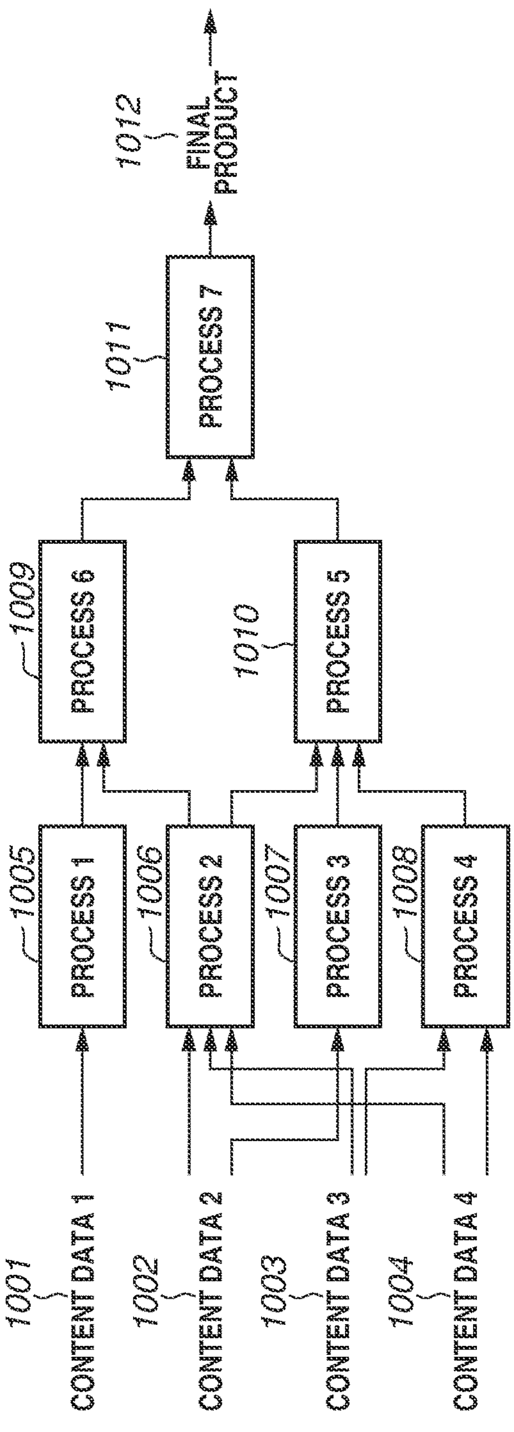

FIG.10B

| | CONTENT DATA | PART OF PRODUCT |
|---|---|---|
| 1001 | CONTENT DATA 1 | COVER |
| 1002 | CONTENT DATA 2 | DOCUMENT (MONOCHROME) |
| 1003 | CONTENT DATA 3 | PHOTOGRAPH (COLOR) |
| 1004 | CONTENT DATA 4 | FIGURE (COLOR) |

FIG.10C

| | PROCESS | PROCESSING TO BE EXECUTED |
|---|---|---|
| 1005 | PROCESS 1 | CMS (CMYK + FEATURE COLOR) |
| 1006 | PROCESS 2 | SPINE WIDTH PARAMETER DETERMINATION |
| 1007 | PROCESS 3 | MISSING CHARACTER INSPECTION |
| 1008 | PROCESS 4 | CMS (CMYK) |
| 1009 | PROCESS 5 | BOOK BLOCK PRODUCTION |
| 1010 | PROCESS 6 | COVER PRODUCTION |
| 1011 | PROCESS 7 | BOOK COMBINING |

| | 1101 | 1102 |
|---|---|---|
| | CONTENT DATA FILE | FINALIZED INFORMATION |
| 1103(1001) | Content1.pdf | FALSE |
| 1104(1002) | Content2.pdf | FALSE |
| 1105(1003) | Content3.pdf | TRUE |

FIG.15

```
<ContentDelivery TimeStamp="2021-01-15T13:30:00+0900"
 BuisinessID="YYYYY" PrintProviderName="BBB Printer" BuyerName="AAA00000"
 UpdateMethod="Add">                                                        } 904

<xjdf:XJDF JobID="item1" Types="Product Delivery">
<xjdf:ResourceSet Name="RunList" Usage="Input">
<xjdf:Resource>
<xjdf:RunList>
<xjdf:FileSpec MimeType="Application/pdf" URL="file:///Contnt3.pdf"/>  ~519
</xjdf:RunList>
</xjdf:Resource>
</xjdf:ResourceSet>
</xjdf:XJDF>                                                                } 905

</ContentDelivery>
```
1501

```
<Finalized TimeStamp="2021-01-15T13:45:10+0900"
 RefID="YYYYY" PrintProviderName="BBB Printer" BuyerName="AAA00000"
 File="Content3.pdf"/>  ~519
```
1402

INFORMATION PROCESSING APPARATUS AND CONTROL METHOD FOR THE SAME

BACKGROUND

Field of the Disclosure

The present disclosure relates to a technique for submitting printed products.

Description of the Related Art

In the commercial printing field, an increasing number of orderers have recently demanded electronic order receipt/placement such as web order placement and electronic content submission work when orderers request printing business operators to produce printed products. In addition, there has been recently an increasing demand for a desired system being provided from the printing business operator.

In response to these demands, some printing companies have released a system providing an order receipt/placement system that is based on a web system. To prevent an order receipt system and an order placement system from varying among companies, the standard specification of electronically-traded data that is intended to commonalize various types of commands and information to be exchanged in order receipt/placement work, such as PrintTalk, has been considered.

Japanese Patent Application Laid-Open No. 2004-213378 discusses a system that makes order placement of printed products and content submission using an electronic content submission management server and a request terminal.

Japanese Patent Application Laid-Open No. 2004-213378 discusses a system that submits content data at the time of order placement, but does not assume a case where content data is transmitted after the order placement. For this reason, if an orderer transmits content data afterward or replaces content data, for example, a printing business operator cannot determine whether the content data is finalized data. A printing business operator therefore cannot carry on processing (e.g., print processing) to be started after the reception of content data.

SUMMARY

Embodiments of the present disclosure have been devised in view of the above-described situation. Embodiments of the present disclosure are directed to providing a technique that enables a printing business operator to determine whether content data is finalized data, in a system that can transmit content data after order placement.

According to embodiments of the present disclosure, an information processing apparatus includes a receiving unit configured to receive order data for a printed product, and content data for the order data, and a control unit configured to perform control in such a manner as to perform production of the printed product. The order data for the printed product and the content data for the order data are received at different timings. The receiving unit further receives finalized information about the content data. The control unit performs control in such a manner as to perform production of the printed product based on the order data, the content data and the finalized information.

Further features of the present disclosure will become apparent from the following description of exemplary embodiments with reference to the attached drawings.

BRIEF DESCRIPTION OF THE DRAWINGS

FIG. 9A illustrates an example of information to be exchanged between the first and second information processing apparatuses according to the first exemplary embodiment.

FIG. 9B illustrates an example of information to be exchanged between the first and second information processing apparatuses according to the first exemplary embodiment.

FIG. 9C illustrates an example of information to be exchanged between the first and second information processing apparatuses according to the first exemplary embodiment.

FIGS. 10A to 10C illustrate an example of a dependence relationship between content data and a process included in a workflow according to the first exemplary embodiment.

FIG. 11 illustrates a management table of content data stored in the second information processing apparatus according to the first exemplary embodiment.

FIG. 15 illustrates an example of information to be exchanged between the first and second information processing apparatuses according to the second exemplary embodiment.

DESCRIPTION OF THE EMBODIMENTS

Hereinafter, some exemplary embodiments of the present disclosure will be described with reference to the drawings. The following exemplary embodiments are not intended to limit the disclosure, and not all the combinations of the features described in the exemplary embodiments are used in the solution of the disclosure.

Figure 1:
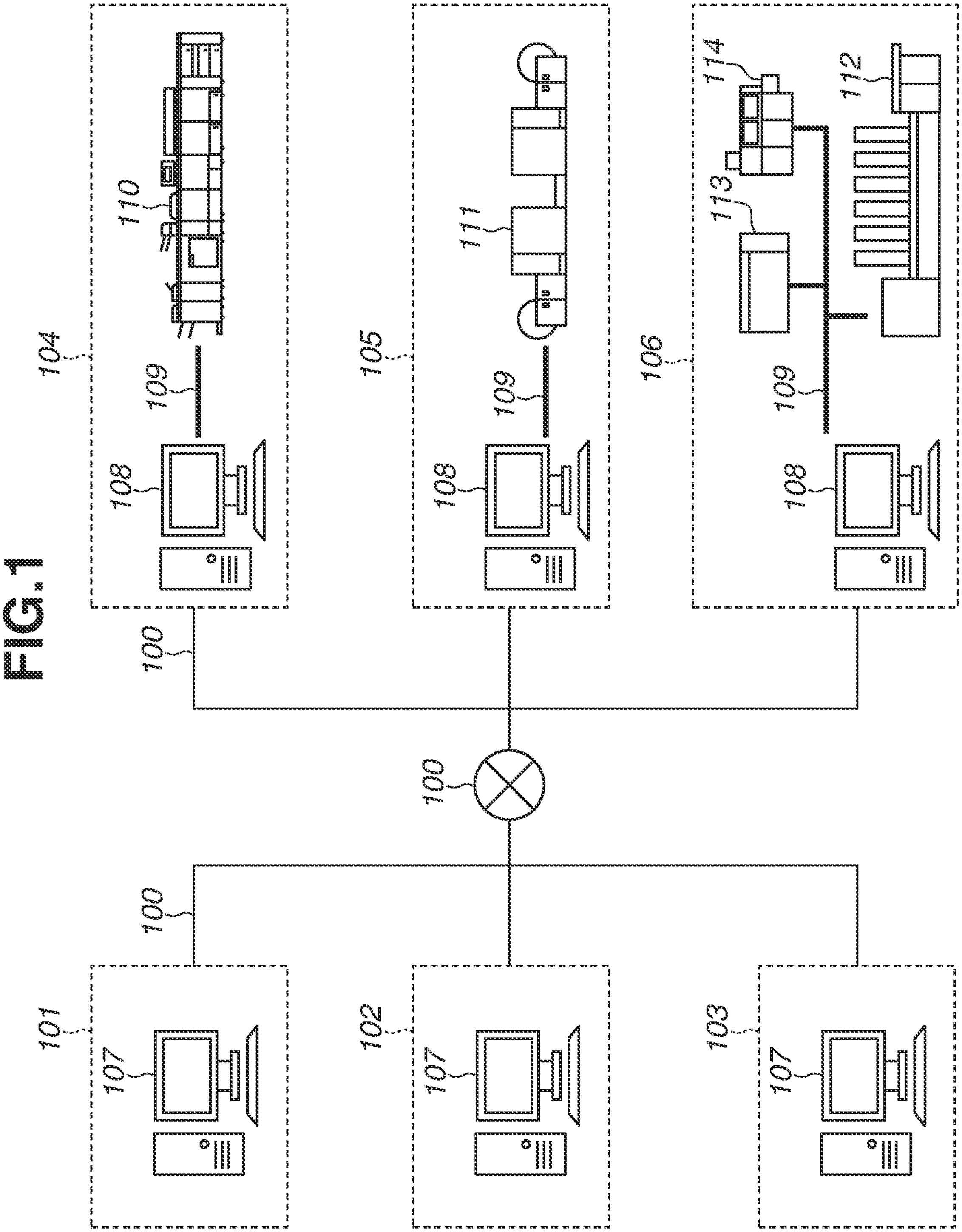
FIG. 1 is a block diagram generally illustrating an order receipt/placement system and a printing business operator system according to a first exemplary embodiment.

FIG. 1 is a block diagram illustrating an order receipt/placement system according to a first exemplary embodiment.

The system is broadly divided into orderer systems (101, 102, and 103) and printing business operator systems (104, 105, and 106), which are connected to one another via an internet 100. At least one or more information processing apparatuses 107 are included in each of the orderer systems (101, 102, and 103).

Hereinafter, an internal configuration of the printing business operator system (104, 105, or 106) will be described in detail. As illustrated in FIG. 1, a plurality of apparatuses is connected to one another via a network 109. As examples of the plurality of apparatuses, an information processing apparatus 108, an image forming apparatus (110, 111, or 112), a laminator 114, and a computer to plate (CTP) 113 are connected.

The image forming apparatus 110 is a cut-sheet type digital printing machine. The image forming apparatus 111 is a digital printing machine for continuous-form paper. The image forming apparatus 112 is an offset-type printing machine. A printing company normally owns a plurality of devices having different properties, and performs production after selecting an optimum image forming apparatus in view of various conditions such as the details of a received order, the number of products, a unit price of the products, and quality.

Each apparatus is controlled under workflow software components operating on the information processing apparatus 108, and produces products by processing electronically-traded data received from the orderer system (101, 102, or 103) and data submitted therefrom. Requests related to the order receipt/placement of printed products are transmitted from the orderer system (101, 102, or 103) and received by the printing business operator system (104, 105, or 106) via the internet 100 in a commonalized electronic format.

Advantages of a commonalized electronic format used in transmission and reception in order receipt/placement processing performed by a plurality of different orderer systems (101, 102, and 103) with a plurality of different printing business operator systems (104, 105, and 106) will be described below.

First of all, whichever printing business operator among a plurality of printing business operator systems an orderer system selects in placing an order for a printed product, the orderer system needs not perform order receipt/placement processing by a mode varying for each unique system originally provided by a printing company system. This is because the order receipt/placement processing can be achieved by using a common order placement system based on a commonalized electronic format. In other words, even different printing companies can provide a common system to the orderer systems (101, 102, and 103). That is, even in the case of placing orders with a plurality of printing business operators, various types of processing for order placement are unified. Consequently, various types of work related to order placement get further streamlined, commonalized, and automated.

Secondly, the printing business operator systems (104, 105, and 106) need not receive orders related to manufacturing work of printed products from a plurality of different orderer systems (101, 102, 103) in different modes. This is because a common order receipt system can be used based on a commonalized electronic format. In other words, even in the case of receiving orders for work from a plurality of different orderers, an order receiver can perform order receipt processing by a unified method. Consequently, various types of work related to order receipt on printing business operator systems get further streamlined, commonalized, and automated.

Aside from the above-described advantages, various advantages can be carried by the orderer systems (101, 102, and 103) and the printing business operator systems (104, 105, and 106) using, in a unified manner, an order receipt/placement system of printed products based on the control using a commonalized electronic format. For example, suppose a case of newly requesting a printing business operator different from a printing business operator that has previously received a commission of work, to perform manufacturing of the same printed products. Information to be transmitted and received in order receipt/placement has a commonalized electronic format, and systems owned by an order receiver and an orderer are configured to electronically process order receipt and placement work in accordance with the commonalized electronic format. It is therefore unnecessary to be aware of a change in business operator undertaking manufacturing, even when a printed product manufacturing request is newly issued to the above-described printing business operator different from the conventional printing business operator. Thus, it is possible to flexibly change a printing business operator to which a manufacturing request is to be issued, unlike the conventional art.

The following additional advantages are also derived. Electronic data and commands that are transmitted and received between an orderer and a printing business operator at the time of order receipt/placement are commonalized, allowing minimization of unique factors such as a business structure varying depending on the industry custom or company, as is conventionally the case. In other words, this makes it easy to embody a system configuration advantageous in automatizing part or all of various types of processing performed in order receipt/placement work.

Furthermore, suppose printing business operators without an electronic content submission system adapted to web content submission, among others. These business operators would easily introduce an orderer system for transmitting and receiving commonalized electronic data and commands, or use printing business operator systems into a library or a distributed standard application comparing with the previous method. In this manner, this makes it possible to provide an advantage to the entire industry that performs order receipt/placement work of printed products.

Furthermore, as illustrated in FIG. 1, if the printing business operator systems (104, 105, and 106) include the image forming apparatuses (110, 111, and 112) with different properties, the following advantages can be derived. This allows an orderer to easily select a printing business operator that can perform production under a condition beneficial to the orderer, taking advantages of production volume, quality, a delivery date, and other features of image forming apparatuses.

A printing business operator system to be described in the present exemplary embodiment permits "subsequent submission" and "replacement submission" to be described below.

As a business structure of order receipt/placement work of a printed product, an orderer acquires a quotation by conveying the outline of a product order to a printing business operator, and performs order placement processing based on the quotation. When the order placement processing is performed, a printing company sometimes requests the orderer to provide content data as data to be printed, but the business structure has a custom of order receipt/placement work of a printed product that content data is not always created by the time of order placement and some content data is submitted after order placement. In other words, order placement processing and content submission processing are performed as different pieces of processing. This case corresponds to processing referred to as so-called "subsequent submission".

The number of times the same data is submitted is not limited to one. It is known that the same data is often submitted a plurality of times in actual order receipt/placement work for various reasons. For example, when content in content data is changed or updated, the same data is submitted a plurality of times. This case corresponds to processing referred to as so-called "replacement submission".

The following is a description of the orderer system 101 and the printing business operator system 104 as examples, but the orderer system 101 may be changed to the orderer system 102 or 103, or may include a plurality of orderer systems. Similarly, the printing business operator system 104 may be changed to the printing business operator system 105 or 106, or may include a plurality of printing business operator systems.

Figure 2:
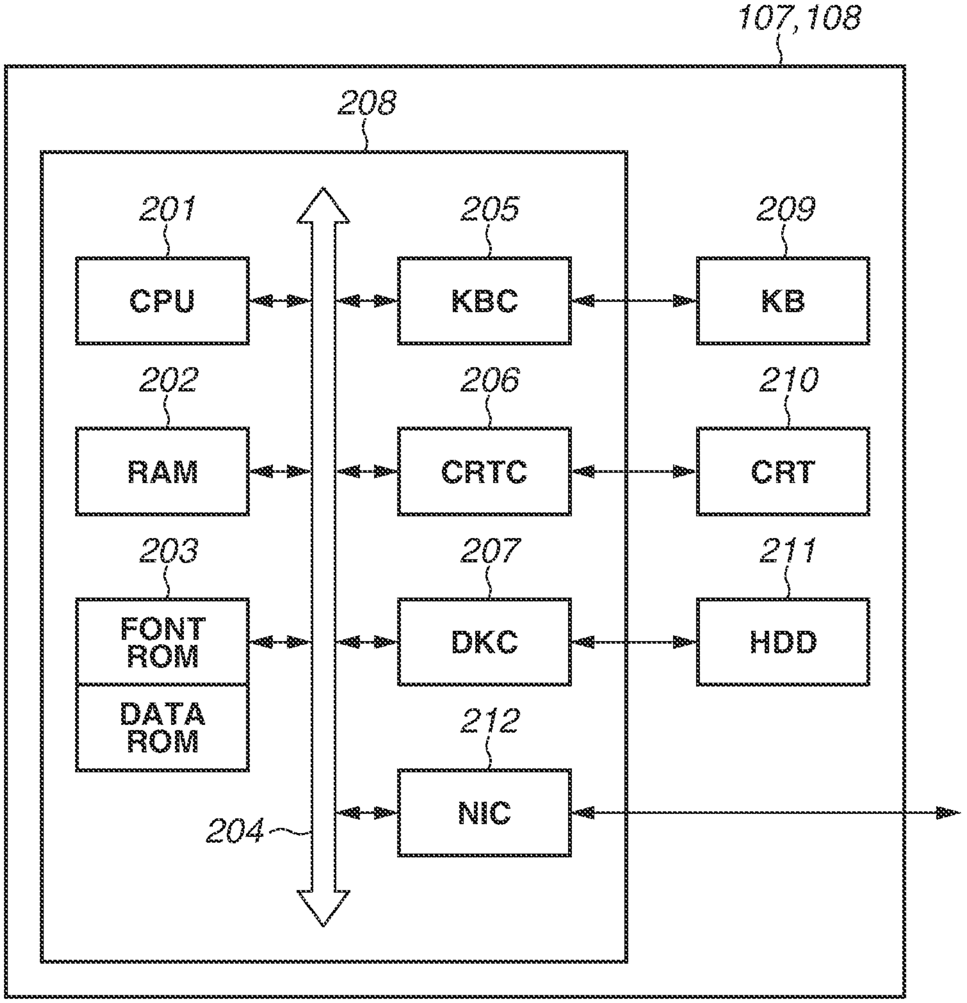
FIG. 2 is a hardware configuration diagram of an information processing apparatus according to the first exemplary embodiment.

FIG. 2 is a block diagram illustrating a configuration of the information processing apparatus (107 or 108). In FIG. 2, a central processing unit (CPU) 201 runs a program of an operating system (OS) or a general-purpose application that is stored in a program read-only memory (ROM) of a ROM 203, or loaded from a hard disk drive (HDD) 211 onto a random access memory (RAM) 202. The ROM 203 includes a font ROM and a data ROM. The RAM 202 functions as a main memory and a work area of the CPU 201. A keyboard controller (KBC) 205 controls entry from a keyboard (KB) 209 and a pointing device (not illustrated). A display controller (CRTC) 206 controls display onto a display unit (CRT) 210. A disc controller (DKC) 207 controls access to the HDD 211 storing boot programs, various applications, and font data. A network controller (NIC) 212 is connected to a network, and performs control processing for communication with another device connected to the network. A bus 204 connects the CPU 201, the RAM 202, the ROM 203, and various controllers, and conveys data signals and control signals.

If the information processing apparatus (107 or 108) is a mobile phone, a touch panel controller is sometimes included in place of the KBC 205. In some cases, a large-capacity storage device is also included in place of the HDD 211. Furthermore, the NIC 212 has an internal configuration varying between a case where the information processing apparatus (107 or 108) is connected to a wired local area network (LAN), a case where the information processing apparatus (107 or 108) is connected to a wireless LAN, and a case where the information processing apparatus (107 or 108) is connected to both of a wired LAN and a wireless LAN. However, such a difference in internal configuration is hidden inside the NIC 212, and the information processing apparatus (107 or 108) is configured to control the system assuming that other modules illustrated in FIG. 2 are equivalent in any case.

Figure 3:
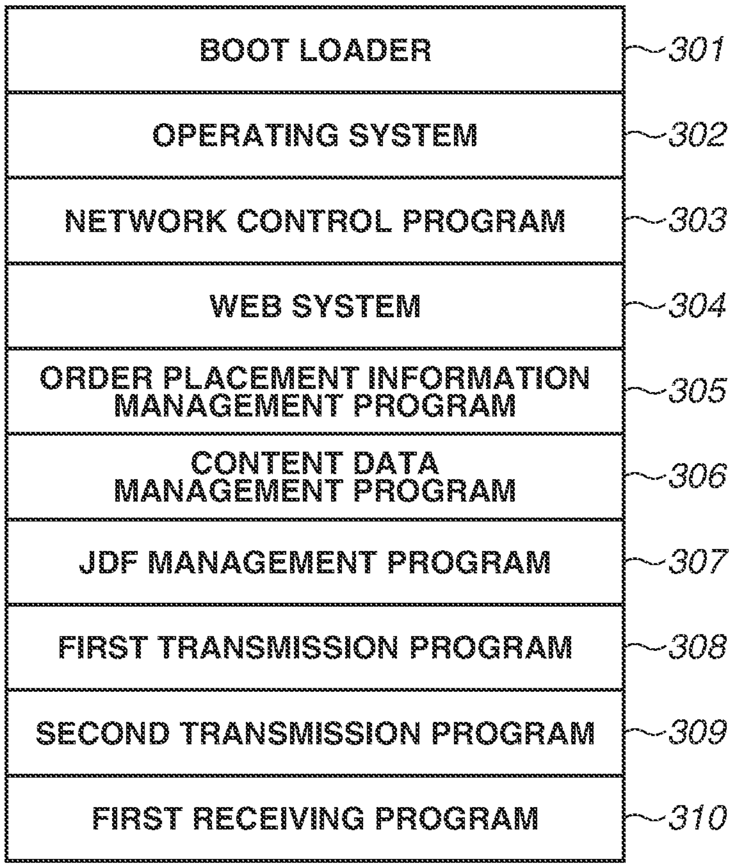
FIG. 3 is a software configuration diagram of a first information processing apparatus according to the first exemplary embodiment.

FIG. 3 is a diagram exemplifying the configuration of a program included in the information processing apparatus 107 in the orderer system 101.

A boot loader 301 corresponds to programs to be run immediately after the power of the information processing apparatus 107 is turned on. These programs include programs for running various boot sequences for system startup.

An operating system 302 is a program intended to provide an execution environment for various programs for implementing functions of the information processing apparatus 107. The operating system 302 provides functions such as resource management of memories (i.e., the ROM 203, the RAM 202, the HDD 211, etc.) of the information processing apparatus.

A network control program 303 is a program that is run when data is transmitted to and received from a device connected via a network. In other words, the network control program 303 is software that is used when data and files are transmitted to and received from an external device via the Internet 100 by controlling the NIC 212.

A web system 304 is a program that controls the reception and acceptance of a web-based service from an external device connected via a network, and the transmission of data and commands to an external web service.

An order placement information management program 305 is a program playing a key role in the orderer system 101. That is, an orderer performs the following processing for printed products with the external printing business operator system 104, which is a primary objective of the orderer system 101. More specifically, the processing includes the reception and interpretation of requests issued using various types of commands related to order placement, and responses to the requests, and the provision of an instruction unit for causing an operator to execute various types of commands. The various types of commands and an execution order thereof will be described below.

A content data management program 306 is a program for managing original data about a printed product to be ordered (i.e., document image data). If the content data management program 306 performs a single process of holding document image data until the document image data is transmitted, the function of file system included in the operating system 302 can be used as-is. In the present exemplary embodiment, the content data management program 306 is assumed to include programs to be used when data is processed, and when content is created and edited.

A job definition format (JDF) management program 307 is a program that is used when a JDF file, which electronically represents the format of a printed product, is created and edited when an order for the printed product is placed with the printing business operator system 104. JDF information edited or created by the program is transmitted by the order placement information management program 305 to the printing business operator system 104 when an order for manufacturing a printed product is placed.

A first transmission program 308 is a unit for performing transmission processing for various types of commands to be transmitted in order receipt/placement processing from the orderer system 101 to the printing business operator system 104. Commands to be transmitted by the first transmission program 308 will be described below.

A second transmission program 309 is a transmission unit for transmitting content data as print target data, after an order placement command (order data) is transmitted and accepted, among various types of commands to be transmitted by the first transmission program 308. The content data and an operation of the second transmission program will be described below.

A first receiving program 310 is a unit for receiving response data as a processing result obtained by commands and with data transmitted by the first transmission program 308 and the second transmission program 309 to the printing business operator system 104, and analyzing a received result.

Figure 4:
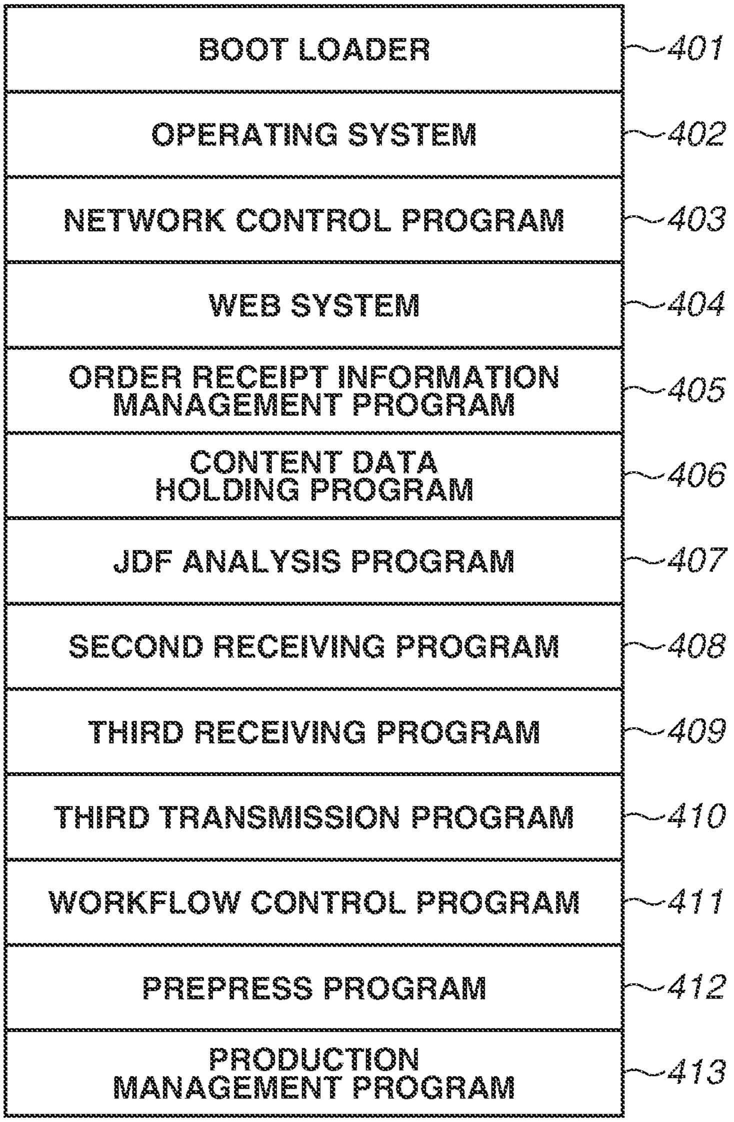
FIG. 4 is a software configuration diagram of a second information processing apparatus according to the first exemplary embodiment.

FIG. 4 is a diagram exemplifying the configuration of a program included in the information processing apparatus 108 in the printing business operator system 104.

The processing to be performed and roles of a boot loader 401, an operating system 402, a network control program 403, and a web system 404 are similar to the corresponding components in FIG. 3 that have the same names, and the description will be omitted.

An order receipt information management program 405 is a program playing a key role in the printing business operator system (101, 102, or 103), and is sometimes called a management information system (MIS). An orderer receives requests issued by various types of commands related to order placement of printed products made by the orderer system 101, which is a primary objective of the printing business operator system 104. Then, the order receipt information management program 405 transmits a response as an execution result, and provides an instruction unit or other units for causing an operator to execute various types of commands. The various types of commands and an execution order thereof will be described below.

A content data holding program 406 is a program for managing print target data submitted from the orderer system 101.

A JDF analysis program 407 is a program for receiving a JDF file, which electronically represents the format of a product, and analyzing the JDF file when a request for order placement of printed products is received from the orderer system 101. The JDF analysis program 407 is used for setting preliminary conditions for performing production based on information included in a JDF file. Examples of the preliminary conditions include the format of a product, the number of copies, and a medium to be used. For example, the JDF analysis program 407 is used when a preliminary setup of a workflow or a production planning is made. Based on the information, processing to be performed in each process included in a workflow, or a job ticket of each process is created. The preliminary setup of the workflow and the creation of a job ticket of each process are performed for the purpose of preliminary processing for content data aimed at enhancing productivity. The preliminary processing to be performed on each piece of content data in a corresponding process will be described below.

A second receiving program 408 is a program for performing receiving processing on various types of commands transmitted by the first transmission program 308 illustrated in FIG. 3.

A third receiving program 409 is a program for receiving content data transmitted by the second transmission program 309 illustrated in FIG. 3.

Examples of commands and data to be received by the second receiving program 408 and the third receiving program 409 will be described below.

A third transmission program 410 is a program for transmitting reception results of the second receiving program 408 and the third receiving program 409 as responses, to the first receiving program 310 in the orderer system 101 illustrated in FIG. 3. The commands and data received by the second receiving program 408 and the third receiving program 409 are processed by the order receipt information management program 405 and the content data holding program 406, and responses indicating processing results are transmitted by the third transmission program 410.

A workflow control program 411 is a program for intensively managing processing and control that are to be performed between devices connected via the network 109 in the printing business operator system 104, and job execution in each process. The workflow control program 411 constitutes the core of the printing business operator system 104. When products are manufactured in a plurality of processes (i.e., manufactured using a plurality of apparatuses), the workflow control program 411 controls an execution order of the plurality of processes, and controls job execution. The workflow control program 411 also controls the selection and switch of an apparatus to be used, and recovery production. The workflow control program 411 also performs processing of issuing various instructions to an operator operating inside the printing business operator system 104.

The workflow control program 411 defines processes performed for producing products based on the following information. First of all, the workflow control program 411 defines an order placement command (order data) to be received by the second receiving program 408. The order placement command is transmitted when the printing business operator system 104 receives an order from the orderer system 101, and includes order detail information to be held and managed by the JDF analysis program 407. Secondly, the workflow control program 411 defines content data to be received by the third receiving program 409. After the definition, the workflow control program 411 generates, maintains, manages, and controls a job in a workflow. By running a job in a workflow for each process, a product demanded by an orderer is produced in a step-by-step manner, and a final product is consequently produced.

In the present exemplary embodiment, a description will be given of an example case where, when content data is received from the orderer system 101, the workflow control program 411 also controls executability of processing of a content submission command corresponding to the content data.

More specifically, as described above as the issue, the orderer system 101 is configured to variably control acceptance of content data to be received by the third receiving program 409, and processing to be performed in the printing business operator system 104 after the acceptance. In other words, the workflow control program 411 has a function of determining content data received by the third receiving program 409, based on finalized information indicating that content data is finalized by the orderer system 101. In other words, the workflow control program 411 in the present exemplary embodiment has a function of determining whether content data received by the orderer system 101 is in a "finalized state". If the state of content data that has been determined by the workflow control program 411 in the present exemplary embodiment is the finalized state, it can be determined that the orderer system 101 indicates that a further subsequent submission or replacement submission of the content data is not to be performed. In such a case, the printing business operator system 104 accordingly becomes ready to start the production using submitted data, by operating a workflow in which the content data is managed by the workflow control program 411.

On the other hand, if it cannot be determined that content data received from the orderer system 101 is in the "finalized state", the following determination is made. Specifically, the printing business operator system 104 can determine that a further subsequent submission or replacement submission of the content data might be performed at a later timing. In this case, by preventing the workflow control program 411 from starting production using the content data, the printing business operator system 104 can efficiently control a workflow in such a manner that redundant processing or regression will be not caused by the update of content data accompanied by a subsequent submission or replacement submission that might be performed later.

A prepress program 412 is a program for performing a preprocessing process of printing, including imposition, image processing, and data format conversion on content data received by the third receiving program 409 and managed by the content data holding program 406. The prepress program 412 is run under the control of the workflow control program 411.

A production management program 413 is a program for managing an operating plan and an operating status of devices and workers of the entire printing business operator system 104 in cooperation with the workflow control program 411.

Figure 5A:
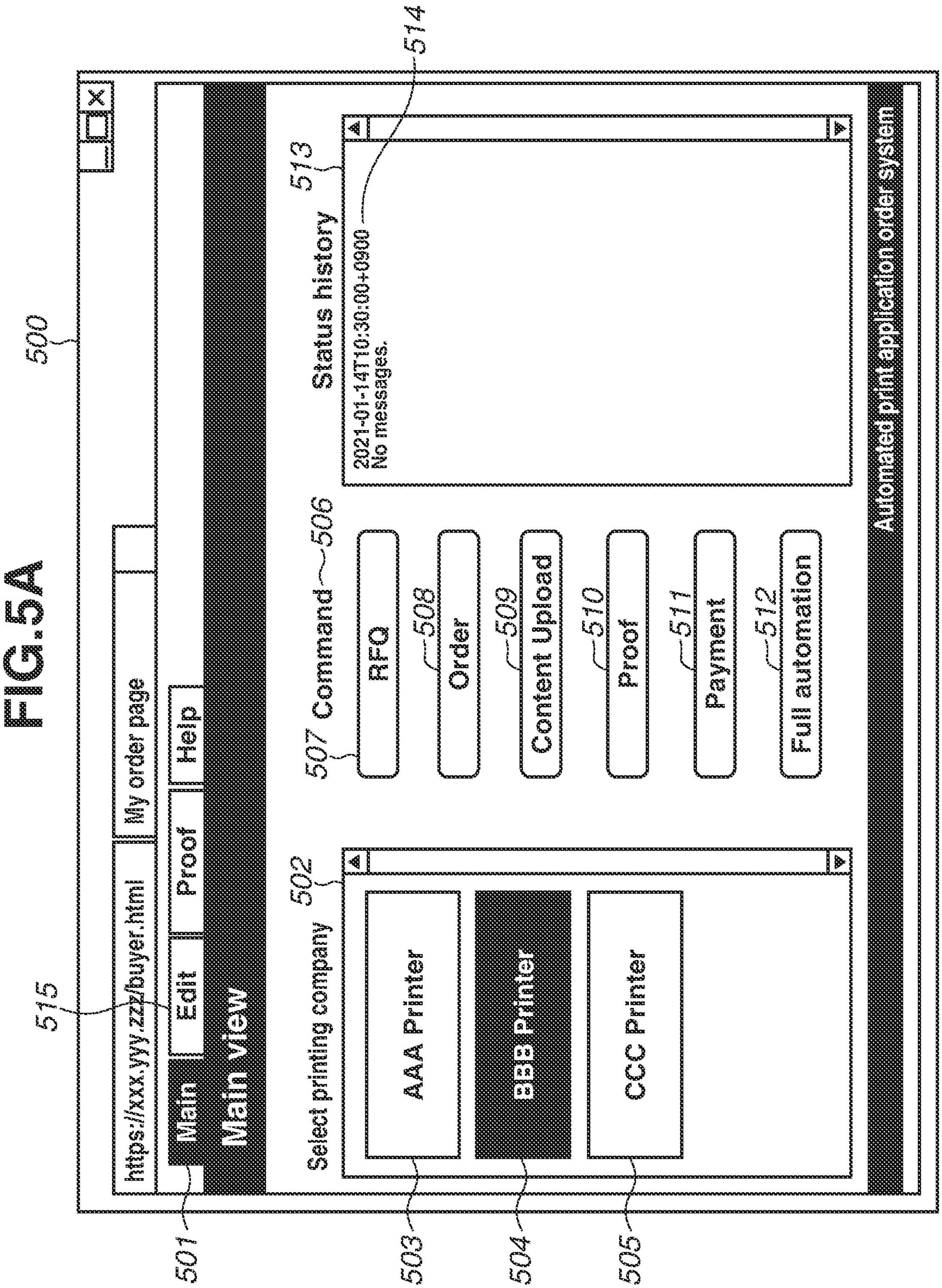
FIG. 5A is a descriptive diagram of an operation procedure in the first information processing apparatus according to the first exemplary embodiment.
Figure 5B:
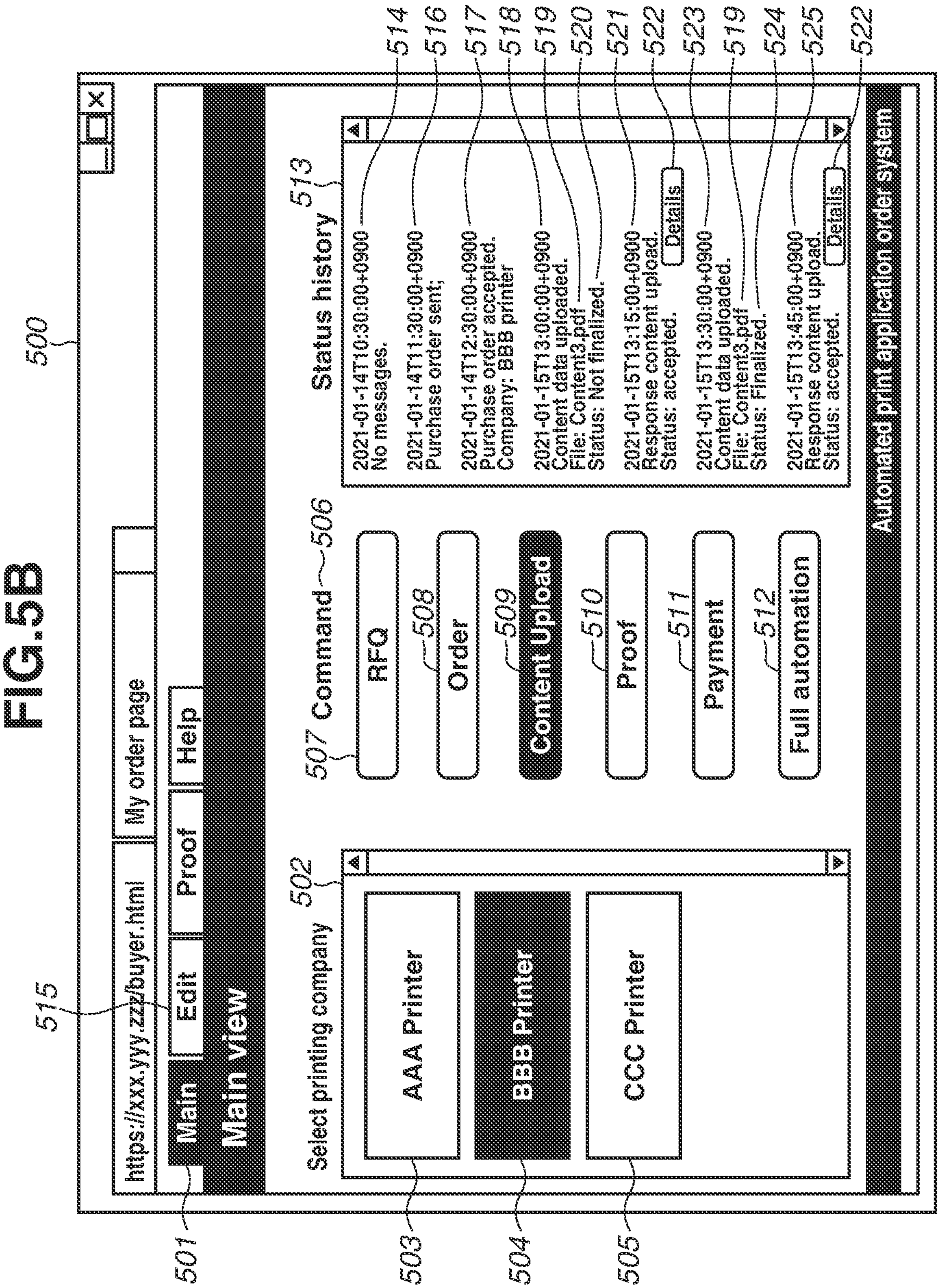
FIG. 5B is a descriptive diagram of an operation procedure in the first information processing apparatus according to the first exemplary embodiment.
Figure 5C:
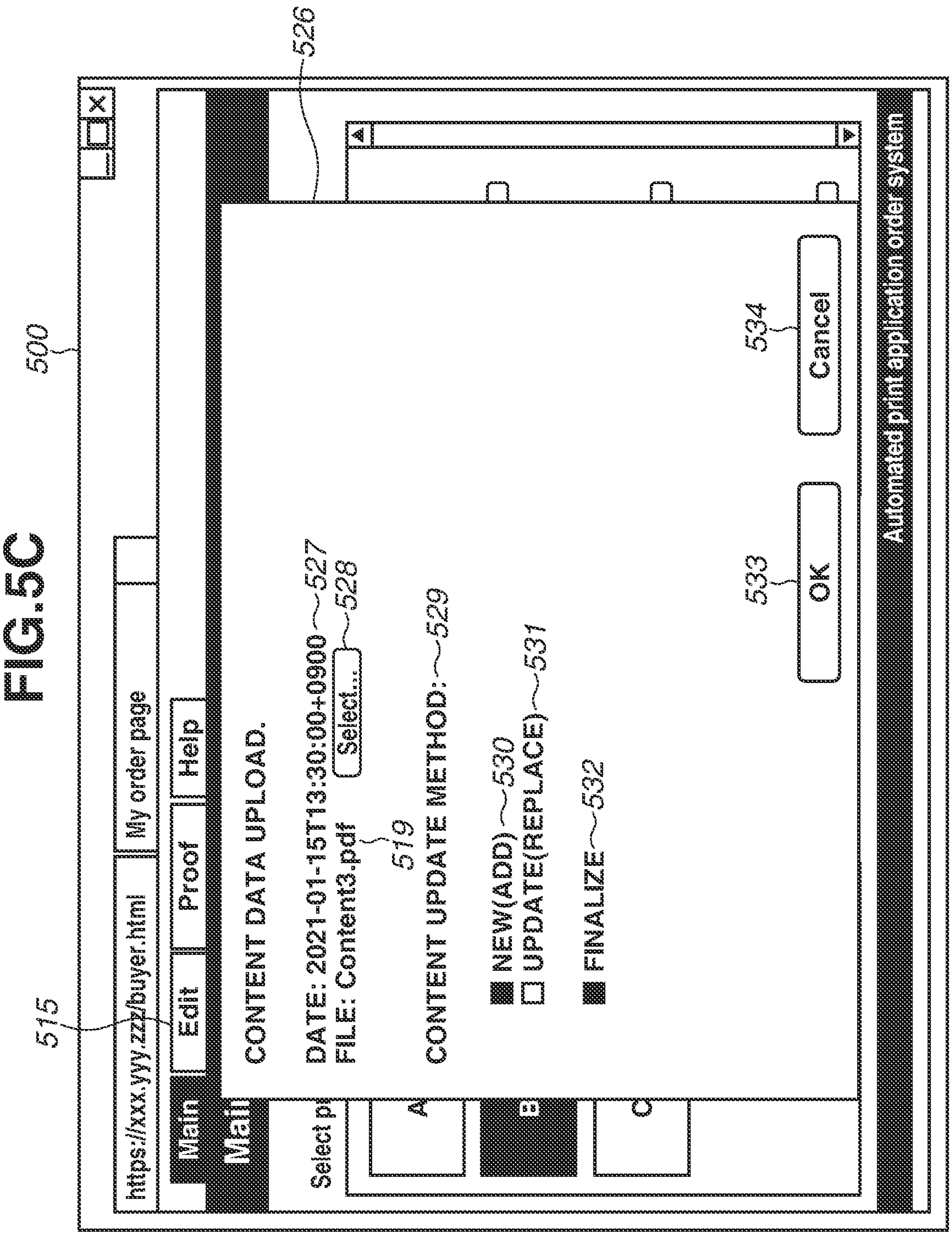
FIG. 5C is a descriptive diagram of an operation procedure in the first information processing apparatus according to the first exemplary embodiment.

FIGS. 5A, 5B, and 5C each illustrate an example of an operation screen to be displayed by the order placement information management program 305 illustrated in FIG. 3, which is run in the information processing apparatus 107 in the orderer system 101.

FIG. 5A illustrates a state in which an order setting main tab 501 of a main screen 500 of the order placement information management program 305 according to the present exemplary embodiment is selected. In the example illustrated in FIG. 5A, a printing business operator selection unit 502 is presented, and a first printing business operator 503, a second printing business operator 504, and a third printing business operator 505 are displayed. An orderer can select a printing business operator that is to perform order placement processing, from among desired printing business operators. The order placement information management program 305 according to the present exemplary embodiment is also configured to enable management such as addition and deletion of a printing business operator that can receive an order, using a printing business operator management screen (not illustrated). The example illustrated in FIG. 5A also indicates a case where the second printing business operator 504 is selected as an order destination.

A command selection unit 506 includes a plurality of selection units provided for selecting commands by which the orderer system 101 conveys various types of processing related to order receipt/placement of printed products, to the printing business operator system 104.

A quotation request command issuance unit 507 is a unit for issuing an instruction to transmit a request command for a quotation of cost in product manufacturing, to the printing business operator selected in the printing business operator selection unit 502. If the quotation request command issuance unit 507 is pressed, the main screen 500 transitions to a screen (not illustrated) for entering various types of information for a quotation request, and the printing business operator performs entry processing of information used in issuing a quotation request command, on this screen.

An order request command issuance unit 508 is an instruction unit for transmitting commands and information used in placing an order for a product to the printing business operator system 104. The commands and data to be transmitted by the instruction unit will be described as follows. First of all, the commands and information include an order placement command generated based on quotation information acquired by selecting the quotation request command issuance unit 507. Secondly, the commands and information include format information of a product that has been generated based on quotation information as well, and edited by a JDF edit unit 515. By selecting the order request command issuance unit 508, the command and the information are transmitted to the selected second printing business operator 504.

A content data transmission unit 509 is a unit used when the orderer system 101 issues an instruction to transmit print target content data to the printing business operator system 104. The system according to the present exemplary embodiment has a configuration in which content submission processing to be performed by the content data transmission unit 509 is selectable and executable as independent processing after order placement processing performed by the order request command issuance unit 508.

In other words, in the custom of order receipt/placement in printed product manufacturing, order placement processing and content submission processing of print target data are not always processed at the same time. In many situations, while a printing business operator preliminarily accepts and performs order placement processing and preliminarily performs various types of processing for production, an orderer creates or updates content data after the order placement processing, and transmits content data to a printing business operator after the order placement.

Not all pieces of content data are always created and submitted to a printing business operator at one time. As one example case, completed parts of content included in content data are sequentially submitted, and content submission processing is completed when the entire content data is submitted.

Moreover, the completion degree of content data is not always high at the time point of the initial content submission. In many cases in printed product order receipt/placement work, content data that can be supplied for production is completed after undergoing proofreading work and preflight work a plurality of times.

As yet another example case, data once submitted is replaced for some reason, or content unplanned at the stage of order placement is added.

In short, order placement processing and content submission processing are frequently performed at different timings in the custom of the printing industry for the above-described reasons. In the first exemplary embodiment, the order request command issuance unit 508 and the content data transmission unit 509 are provided as different units as illustrated in FIG. 5A, for the purpose of flexibly responding to such situations.

The content data transmission unit 509 further has a function of transmitting content data after adding information indicating whether content data to be transmitted to the printing business operator system 104 by the orderer system 101 using the content data transmission unit 509 is in the finalized state. Furthermore, a setting unit of information indicating whether content data is in the finalized state at the time is included.

A proof request unit 510 is a unit for issuing an instruction to transmit a command for requesting so-called test printing under manufacturing conditions with content data to be used in production of a printed product that have been transmitted by the order request command issuance unit 508 and the content data transmission unit 509.

A payment execution unit 511 is a unit for issuing an instruction to transmit a command for performing payment processing for a product produced by the printing business operator system 104 through units such as the order request command issuance unit 508, the content data transmission unit 509, and the proof request unit 510. At this time, the system according to the present exemplary embodiment is assumed to calculate the amount of money based on the amount of money information mainly acquired as an execution result of the quotation request command issuance unit 507, and perform settlement processing mainly using an electronic method.

A status check unit 513 is a unit provided for displaying the details of commands and responses to be transmitted between the orderer system 101 and the printing business operator system 104. Specifically, information displayed in the status check unit 513 mainly includes history information about command transmission performed via the command selection unit 506 from the orderer system 101 to the printing business operator system 104. Alternatively, information displayed in the status check unit 513 includes response information indicating an execution result of a command received by the printing business operator system 104. Alternatively, information displayed in the status check unit 513 includes commands and notification information to be transmitted by the printing business operator system 104 to the orderer system 101. The status check unit 513 according to the present exemplary embodiment is configured to perform such information display.

The example illustrated in FIG. 5A indicates a state in which the orderer system 101 has just selected the second printing business operator 504, and no command has been executed via the command selection unit 506. Thus, a status 1 (514) indicates that no processing has been performed at the time point of 10:30 on Jan. 14, 2021.

FIG. 5B illustrates an example of a transmission/reception history of instruction commands executed by the orderer system 101 to the second printing business operator 504 using various units provided in the command selection unit 506, and responses to the commands, from the state illustrated in FIG. 5A. Hereinafter, based on a command execution history indicated in the status check unit 513, operations of the system according to the present exemplary embodiment, i.e., the details of product order receipt/placement commands executed between the orderer system 101 and the printing business operator system 104 will be described.

In FIG. 5B, a status 2 (516) indicates that an order placement command was transmitted by the order request command issuance unit 508 to the second printing business operator 504 at 11:30 on Jan. 14, 2021. As described with reference to FIG. 5A, when an instruction of an order placement command is issued, JDF data edited and created by the JDF edit unit 515 is also transmitted simultaneously.

A status 3 (517) indicates that the order placement command transmitted in the status 2 (516) was accepted by a printing company.

By the selection of the content data transmission unit 509, transmission processing of content data is performed from the orderer system 101 to the second printing business operator 504. At this time, a status 4 (518) in the status check unit 513 notifies information indicating that the processing was performed at 13:00 on Jan. 15, 2021. A file name (519) of the content data transmitted at the time is also indicated. Furthermore, the example illustrated in FIG. 5B also indicates that the content data in an unfinalized state (520) was transmitted from the orderer system 101 to the printing business operator system 104.

A response (status 5 (521)) indicates that the content submission processing performed by the content data transmission unit 509 as illustrated in the status 4 (518) in FIG. 5B was accepted by the printing business operator system 104. To check more detailed information included in the response from the printing business operator system 104, a detail check display unit 522 is to be pressed.

A status 6 (523) indicates an example case where content submission processing was further performed with respect to the printing business operator system 104 at 13:30 on Jan. 15, 2021, by the selection of the content data transmission unit 509. As illustrated in FIG. 5A, it is also indicated that the file name 519 of the content data is the same as the file name 519 submitted in the status 4 (518). In other words, the content submission processing performed in the status 6 (523) corresponds to replacement submission with the content submission processing performed in the status 4 (518). Furthermore, the example illustrated in FIG. 5B also indicates that content data in a finalized state (524) was transmitted to the printing business operator system 104 in the content submission processing performed in the status 6 (523).

A status 7 (525) indicates a response indicating that the content submission processing performed by the content data transmission unit 509 in the status 6 (523) was accepted by the printing business operator system 104.

FIG. 5C illustrates an example of a content data setting detailed screen 526 for making detailed settings in the content data transmission processing after the selection of the content data transmission unit 509 included in the orderer system 101. The screen illustrated in FIG. 5C indicates an example case where data indicated by the file name 519 is submitted at a time indicated by a time stamp 527.

A content file to be submitted is selectable by a file selection unit 528, and the file name 519 of the selected content file is displayed.

A content data transmission mode setting unit 529 provides a unit for setting the details of transmission settings to be used when the orderer system 101 transmits selected content data indicated by the file name 519 to the printing business operator system 104.

A new data submission selection unit 530 is a unit to be selected when the orderer system 101 newly transmits a file selected by the file selection unit 528 and indicated by the file name 519, to the printing business operator system 104.

An update data submission selection unit 531 is a unit to be used for the purpose of updating content data by resubmitting, in a state in which the file selected by the file selection unit 528 and indicated by the file name 519 has been already submitted, a file having the same name.

A submission target data finalization unit 532 is a unit to be selected when data in a finalized state is transmitted from the orderer system 101 to the printing business operator system 104 by the selection of the content data file and the transmission units, which have been described above.

In response to when an OK button 533 is selected, content data and a content data command are transmitted to the printing business operator system 104 based on the above-described settings, and the content data setting detailed screen 526 transitions to the screen illustrated in FIG. 5A or 5B. On the other hand, if a cancel button 534 is selected, the content data setting detailed screen 526 transitions to the screen illustrated in FIG. 5A or 5B without the transmission of content data and a content data command to the printing business operator system 104.

As described above, a series of examples in which commands and responses related particularly to order placement and content submission processing are exchanged between the orderer system 101 and the printing business operator system 104 in the order receipt/placement work of a printed product have been described with reference to FIGS. 5A, 5B, and 5C.

Figure 6A:
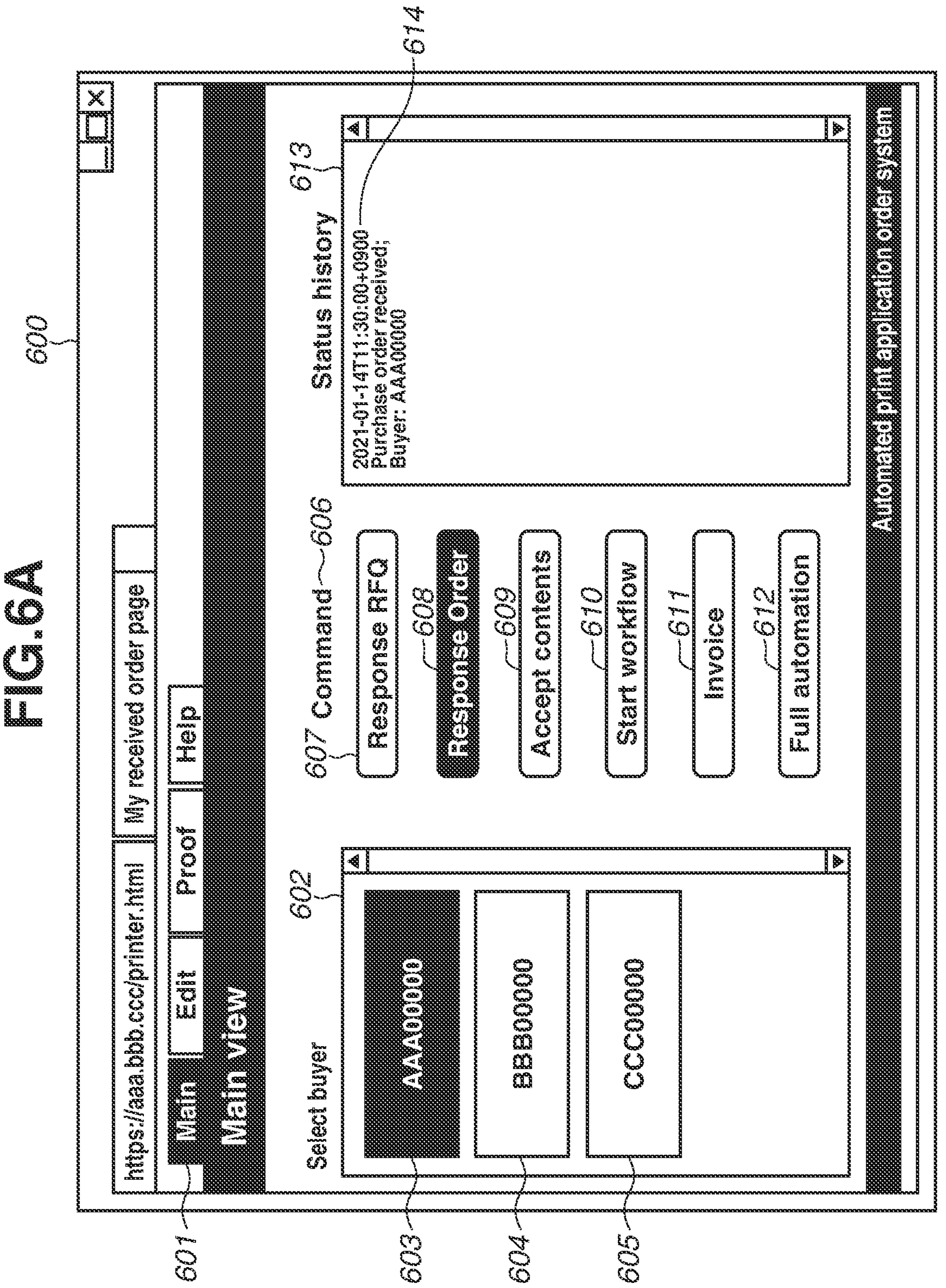
FIG. 6A is a descriptive diagram of an operation procedure in the second information processing apparatus according to the first exemplary embodiment.
Figure 6B:
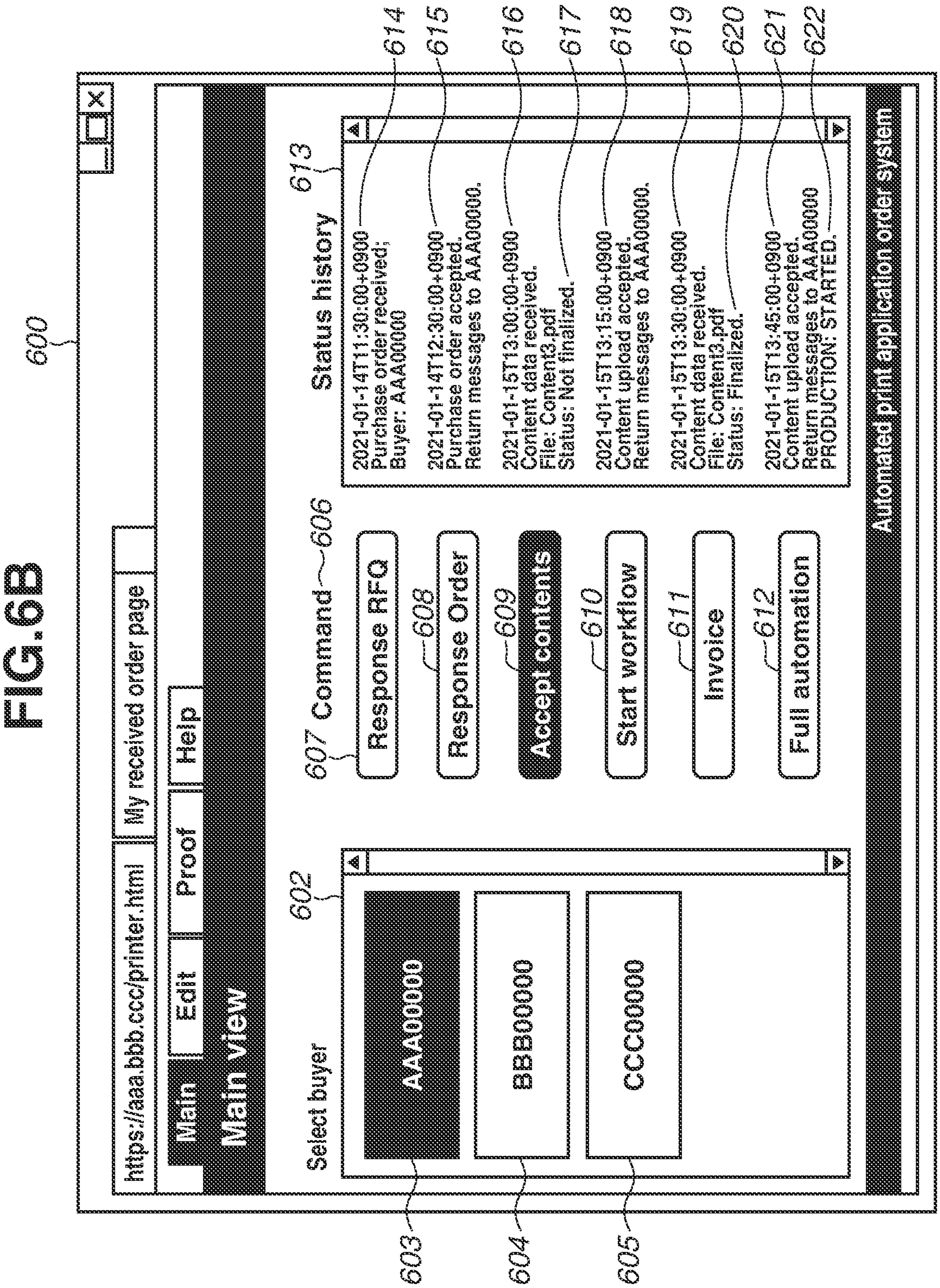
FIG. 6B is a descriptive diagram of an operation procedure in the second information processing apparatus according to the first exemplary embodiment.

FIGS. 6A and 6B each illustrate an example of an operation screen to be displayed by the order receipt information management program 405 illustrated in FIG. 4, which is run in the information processing apparatus 108 in the printing business operator system 104.

FIG. 6A illustrates a state in which an order receipt processing main tab 601 of a main screen 600 of the order receipt information management program 405 according to the present exemplary embodiment is selected. In the example illustrated in FIG. 6A, an orderer selection unit 602 is provided, and a first orderer 603, a second order placement business operator 604, and a third orderer 605 are displayed. An operation unit of the order receipt information management program 405 according to the present exemplary embodiment is configured to enable a printing business operator to individually identify and manage orders received from a plurality of orderers, by such a method. The operation unit can select any of a plurality of orderers and perform processing based on the type of a command indicating a request from the selected orderer. Furthermore, the order receipt information management program 405 according to the present exemplary embodiment is also configured to enable management such as addition and deletion of an orderer that can place an order, on an orderer management screen (not illustrated). The example illustrated in FIG. 6A also indicates a case where the first orderer 603 is in a selected state for a request from the first orderer 603 to be processed.

A command selection unit 606 includes a plurality of selection units provided for selecting commands by which the printing business operator system 104 conveys various types of processing related to order receipt/placement of printed products and performed by the printing business operator, to the orderer (101, 102, or 103). As a main use, the command selection unit 606 is provided as a unit for selecting responses, which are acceptance and responses to various request commands, to the printing business operator selected by the command selection unit 506 in the orderer system 101 illustrated in FIGS. 5A and 5B.

A quotation request response command issuance unit 607 is a unit for transmitting a response to a request command for a quotation of cost in product manufacturing that has been transmitted from the orderer system 101 by the quotation request command issuance unit 507 illustrated in FIG. 5A. A response including quotation money amount information for a designated quotation target is transmitted by the quotation request response command issuance unit 607 to the orderer system 101.

An order placement request response command issuance unit 608 is a unit for transmitting to the orderer system 101 order acceptance or refusal as a response to an order placement command from the orderer system 101 that has been executed by the order request command issuance unit 508 illustrated in FIG. 5A.

A content data acceptance unit 609 is a unit for responding to a data submission request command from the orderer system 101 that has been executed by the content data transmission unit 509 illustrated in FIG. 5A. A response including content data acceptance or refusal is transmitted by the content data acceptance unit 609 to the orderer system 101.

A workflow execution instruction unit 610 is a unit for issuing an instruction to the workflow control program 411 to instruct the workflow control program 411 to perform production if conditions used in the production of the product are satisfied through the transmission and reception of commands related to a series of printed product order receipt/placement work actions, which have been described above. At the stage of order receipt, the printing business operator system 104 can preliminarily issue an execution instruction of workflow processing, as production processing for order placement. The workflow execution instruction unit 610 is used at the time. As described with reference to FIGS. 5A, 5B, and 5C, whether content data as processing target data received from the orderer system 101 is finalized is one of key conditions to be used when it is determined that preliminary processing can be effectively performed.

In other words, when it is determined that content data is finalized, it is revealed that the content data will not be requested to be replaced with subsequent submission or replacement submission. In this case, a printing business operator can perform preliminary processing on the content data. Such front-loaded processing of production and efficient production planning performed under a condition allowing moving up the production enhances total productivity and production capacity. At the same time, intentionally controlling the above-described preliminary processing not to be performed before content data is finalized makes it possible to provide an orderer with convenience including flexibility of subsequent submission and replacement submission without sacrificing productivity.

The configuration of a workflow to be performed by the workflow control program 411 illustrated in FIG. 4, and the operation of the workflow will be described below.

A payment request execution unit 611 is an instruction unit of a command to be selected and executed when the printing business operator system 104 charges an orderer as a requestor the cost of printed product production requested by the orderer system 101. The payment request execution unit 611 is provided in such a manner as to be implemented prior to the payment execution unit 511 illustrated in FIG. 5A, or implemented in reverse order.

A status check unit 613 is a unit for displaying commands received from the orderer system 101 and executed in the command selection unit 606, or responses indicating execution results of the commands executed by the printing business operator system 104. The status check unit 613 in the present exemplary embodiment is configured to be able to display commands executed by the printing business operator system 104 with respect to the orderer system 101, and notification information.

A status 1 (614) indicates that the order placement command transmitted to the second printing business operator 504 by the order request command issuance unit 508 at 11:30 on Jan. 14, 2021 in the status 2 (516) illustrated in FIG. 5B was received.

FIG. 6B illustrates an example of a state in which various types of commands in product order receipt/placement have been executed between the orderer system 101 and the printing business operator system 104, from the state illustrated in FIG. 6A. Hereinafter, based on information presented in the status check unit 613, an example of the details of processing performed by the printing business operator system 104 with the orderer system 101 will be described.

A status 2 (615) indicates that the printing business operator system 104 accepted an order placement request received from the orderer system 101, by the selection of the order placement request response command issuance unit 608. The status 2 (615) indicates a response (response) to the status 1 (614).

A status 3 (616) indicates that the printing business operator system 104 accepted content data and a transmission command for the content data that has been executed by the content data transmission unit 509 in the status 4 (518) illustrated in FIG. 5B. As illustrated in FIG. 5B, the content data transmitted in the status 4 (518) was in the unfinalized state (520). Thus, the unfinalized state is indicated by content data unfinalized state display 617 indicating that the content data is in the unfinalized state.

A status 4 (618) in the example illustrated in FIG. 6B indicates that the printing business operator system 104 transmitted to the orderer system 101 a response to the transmission command for content data that was received in the status 3 (616).

A status 5 (619) in the example illustrated in FIG. 6B indicates information regarding replacement submission processing of content data in the status 4 (518) that was performed in the status 6 (523) illustrated in FIG. 5B. Finalized data identification information 620 indicating that the replacement submission processing was performed on the content data in a finalized state (524) as illustrated in FIG. 5B is indicated. At this stage, the printing business operator system 104 can learn that the printing business operator system 104 is notified by the orderer system 101 that content data indicated by the file name 519 is finalized. In other words, the printing business operator system 104 may preliminarily perform various types of workflow processing related to the production on the content data indicated by the file name 519.

In a status 6 (621), the printing business operator system 104 transmits to the orderer system 101 a response indicating that a notification indicating that content data received in the status 5 (619) is finalized was accepted. Then, a state (622) in the example illustrated in FIG. 6B indicates that, since content data submitted to the printing business operator system 104 is finalized as indicated by the finalized data identification information 620, the workflow execution instruction unit 610 was instructed to perform processing on the data.

Figure 7A:
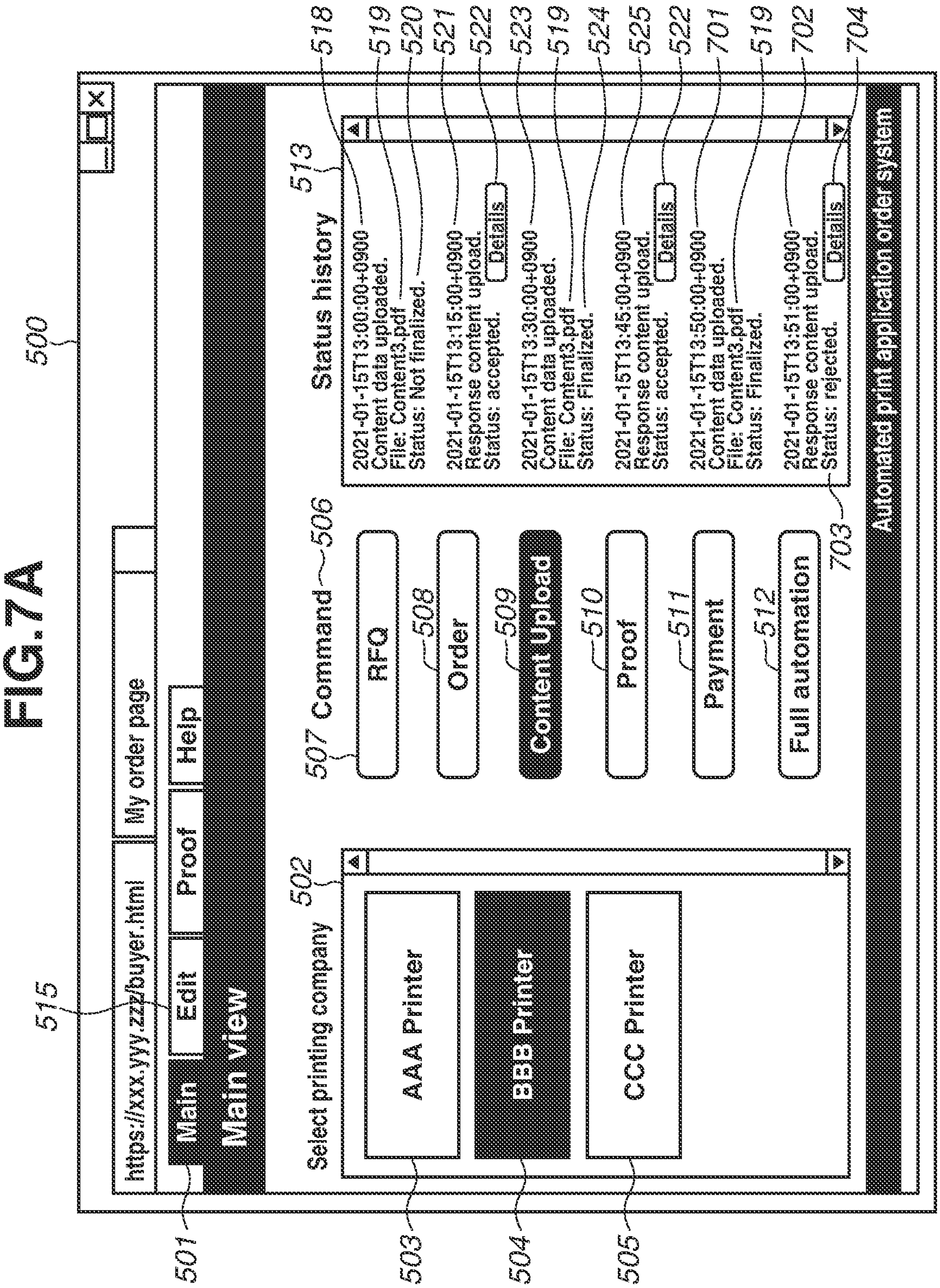
FIGS. 7A and 7B illustrate an example of an operation of additional content data in the second information processing apparatus according to the first exemplary embodiment.
Figure 7B:
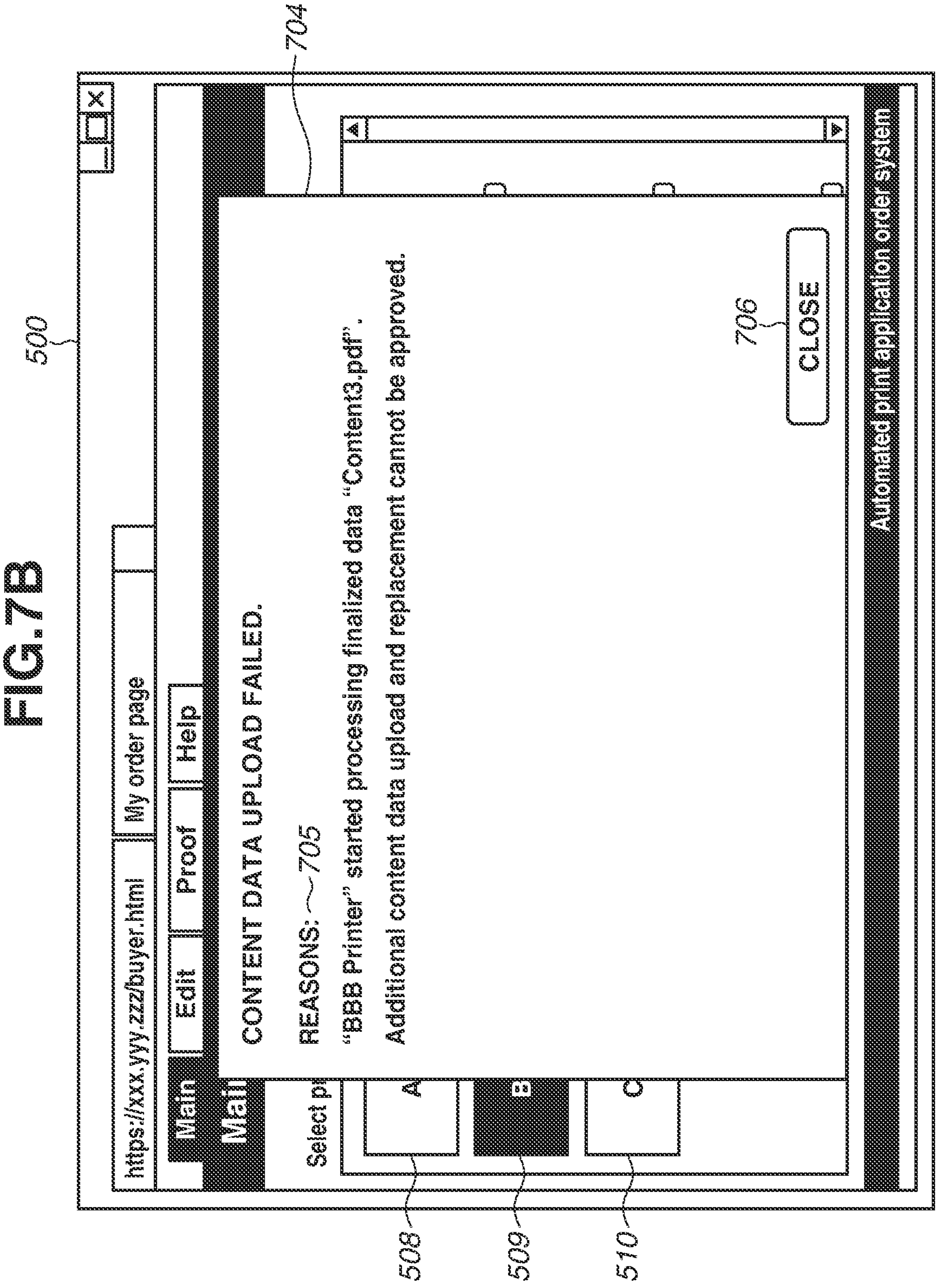

FIGS. 7A and 7B each illustrate an example case where content submission processing is further performed with respect to the printing business operator system 104 selected by the orderer system 101, from the operation described with reference to FIG. 5B.

FIG. 7A illustrates an example of an operation of the orderer system 101 that is performed when content submission processing is further performed on finalized content data as illustrated in FIG. 5B.

FIG. 7A illustrates an example case where, in a status 1 (701), additional data was submitted by the content data transmission unit 509 at 13:50 on Jan. 15, 2021. In other words, FIG. 7A illustrates a case where content submission processing is further performed on a content data file indicated by the file name 519 "Content3.pdf". At the time point of the status 1 (701), the content data indicated by the file name 519 is finalized (524, 620), and processing on the data was started by the workflow execution instruction unit 610 of the printing business operator system 104 (622). In other words, this case corresponds to a case where the orderer system 101 has already explicitly notified that submitted data is finalized, and the data for which the printing business operator system 104 has started production is further submitted. This means that data finalized by the orderer system 101 using the submission target data finalization unit 532 is transmitted to be further subjected to replacement submission.

A status 2 (702) indicates an example case where the printing business operator system 104 transmits to the orderer system 101 a response to content submission processing on the finalized data in the status 1 (701). At the time, the example illustrated in FIG. 7A presents a message (703) indicating that the content submission processing in the status 1 was refused. A detailed factor information presentation unit 704 is a unit provided for checking the details of the response transmitted in the status 2 (702).

FIG. 7B illustrates an example of a screen displayed after the detailed factor information presentation unit 704 is selected on the screen illustrated in FIG. 7A. More specifically, the detailed factor information presentation unit 704 presents information regarding detailed factors related to the reason why a replacement submission request of finalized content data named "Content3.pdf" has not been accepted in the status 1 (701) illustrated in FIG. 7A.

The detailed factor information presentation unit 704 shows a reason 705 why the second printing business operator 504 that had received a replacement submission processing request of finalized content data has not accepted the replacement submission processing. More specifically, the detailed factor information presentation unit 704 presents information indicating that, since the second printing business operator 504 has started production processing of processes of a workflow in the printing business operator that is related to manufacturing of finalized data submitted from the orderer system 101, content submission processing of the data was not accepted.

Figure 8:
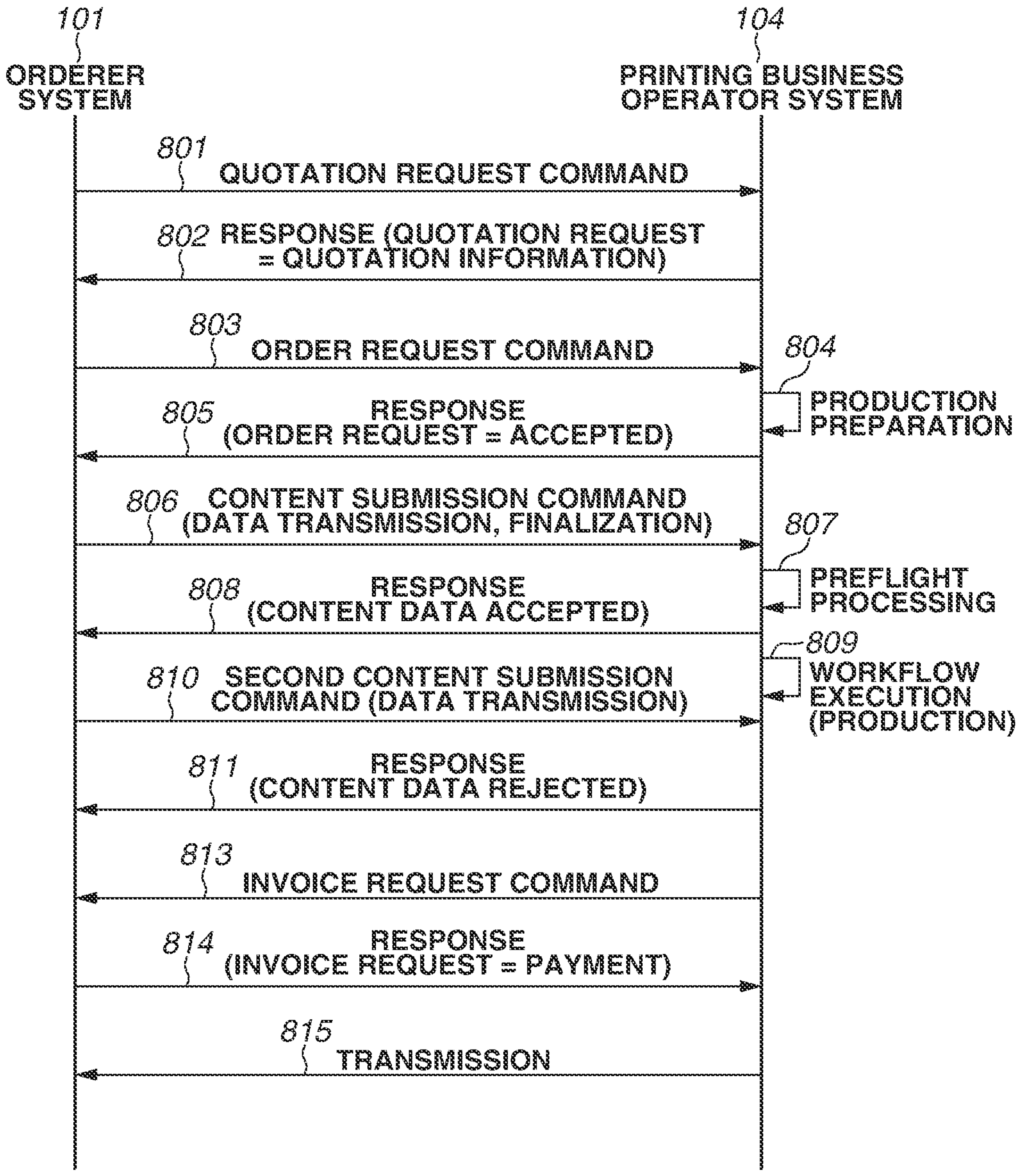
FIG. 8 is a sequence diagram illustrating information to be exchanged between the first and second information processing apparatuses according to the first exemplary embodiment.

FIG. 8 illustrates a sequence of commands and responses to be exchanged between the orderer system 101 and the printing business operator system 104 that are illustrated in FIGS. 5A, 5B, 5C, 6A, and 6B.

A quotation request command 801 is transmitted from the orderer system 101 to the printing business operator system 104. A transmission instruction of the quotation request command 801 is issued by the quotation request command issuance unit 507 as illustrated in FIG. 5A.

The printing business operator system 104 transmits quotation information 802 to the orderer system 101 as a response 802 to the quotation request command 801. A transmission instruction of the response 802 is issued by the quotation request response command issuance unit 607 illustrated in FIG. 6A.

Based on quotation information included in the response 802, the orderer system 101 transmits an order request command 803 to the printing business operator system 104. A transmission instruction of the order request command 803 is issued by the order request command issuance unit 508 illustrated in FIG. 5A.

The printing business operator system 104 that has received the order request command 803 accepts the order placement and prepares for production (804). Specifically, the printing business operator system 104 performs processing for setting up a workflow to be described below. In the system according to the present exemplary embodiment, these are assumed to be performed prior to processing on finalized content data.

In response to when the printing business operator system 104 accepts the order request command 803, the printing business operator system 104 transmits a response 805 indicating the acceptance, to the orderer system 101. A transmission instruction of the response 805 is issued by the order placement request response command issuance unit 608 illustrated in FIG. 6A.

Afterward, the orderer system 101 creates content data to be printed, and transmits the content data to the printing business operator system 104 by transmitting a content submission command 806 upon completion of preparation. The orderer system 101 thereby performs content submission processing. A transmission instruction of the content submission command 806 is issued by the content data transmission unit 509 illustrated in FIG. 5A.

FIG. 8 illustrates an example case where data subjected to the content submission processing performed in response to the content submission command 806 is data submitted in the finalized state (524) illustrated in FIG. 5B. In this case, as the submitted data is finalized, content resubmission processing such as replacing content data again at a subsequent stage is not approved. The printing business operator system 104 starts preliminary processing for production that is based on content data accepted in response to the content submission command 806.

More specifically, the printing business operator system 104 that has received content data performs preflight processing 807 on the received data, and transmits a response 808 to the orderer system 101 after the end of the preflight processing 807. A transmission instruction of the response 808 is issued by the content data acceptance unit 609. Then, immediately after the transmission, production processing using content data submitted in response to the content submission command 806 is preliminarily started. That is, production processing 809 of the processing in the workflow prepared in step 804 is preliminarily started.

FIG. 8 here illustrates a case where, after the sequence proceeds up to step 809, new content data for the data in finalized state (524) that has been submitted in response to the content submission command 806 is further submitted. In other words, FIG. 8 illustrates a case where content submission processing on new content data about data submitted in response to the content submission command 806 is performed by the orderer system 101 to the printing business operator system 104 by transmitting a second content submission command 810.

That is, under the status in which data in the finalized state has been accepted and preliminary processing of production of the data has been started, the content submission processing of new content data is not accepted in this system. The second content submission command 810 thus is determined to be a command for resubmission of finalized data, and the acceptance of the content submission command is rejected. As a result, a second response 811 indicating that the second content submission command 810 was not accepted is transmitted from the printing business operator system 104 to the orderer system 101. The state of the screen displayed in this case by the order placement information management program 305 of the orderer system 101 becomes the state as illustrated in FIG. 5B or 5C.

At an appropriate timing at which production of a requested printed product ends, an invoice command 813 for overhead costs in the production is transmitted from the printing business operator system 104 to the orderer system 101. A transmission instruction of the invoice command 813 is issued by the payment request execution unit 611 illustrated in FIG. 6A.

To perform suitable payment processing, the orderer system 101 that has received the invoice command 813 transmits a response 814 for making payment to the printing business operator system 104. During the course of transmission of the response 814, electronic settlement processing is performed in the system according to the present exemplary embodiment.

A printed product manufactured after the completion of the settlement processing or manufactured before the settlement processing is subjected to transmission 815 from the printing business operator system 104 to the orderer system 101. The transmission processing is performed by a designation unit (not illustrated) in the system according to the present exemplary embodiment.

FIGS. 9A, 9B, and 9C each illustrate an example of data in commands and responses to be transmitted and received between the orderer system 101 and the printing business operator system 104.

FIG. 9A illustrates an example of data in the order request command 803 and the response 805 to the order request command 803.

An order information unit 901 includes a command character string indicating that the data is an order request command, a BusinessID for identifying a series of handled electronic data, and information indicating an orderer and a printing company involved in this order.

An order detail description unit 902 includes production details such as the trade name of a product, the format of the product, and the number of copies, and information regarding a medium to be used. These correspond to information created by the JDF management program 307 illustrated in FIG. 3, and the JDF edit unit 515 illustrated in FIGS. 5A, 5B, and 5C.

An order response description unit 903 includes information regarding reply data to an order placement request. As an example, similarly to the order information unit 901, the order response description unit 903 includes a command character string indicating that the data is a response to an order request command, a BusinessID for identifying a series of handled electronic data, and information indicating an orderer and a printing company involved in this order. The order response description unit 903 also includes OrderStatus indicating that the order has been accepted, and comment information in a format that is to be returned from the printing business operator system 104 to the orderer system 101.

FIG. 9B illustrates an example of data in the content submission command 806 and the response 808 to the content submission command 806.

A content submission information unit 904 includes a command character string indicating that the data is a content submission command, a BusinessID for identifying a series of handled electronic data, and information indicating an orderer and a printing company involved in this order.

When the content data is subjected to content submission processing, the content data also includes finalization identification information 908 as information explicitly indicating whether the content data is finalized data. FIG. 9B illustrates an example case where the value of the finalization identification information 908 is true (i.e., the content data is finalized). In other words, when the printing business operator system 104 receives the content submission command illustrated in FIG. 9B from the orderer system 101, the content data is recognized as finalized data. The setting of the finalization identification information 908 is made, generated, and conveyed by the order placement information management program 305 processing the selection processing of the submission target data finalization unit 532 illustrated in FIG. 5C, and the second transmission program 309 controlling the selection processing.

In a content data designation unit 905, the file of electronic data to be submitted is designated. More specifically, FIG. 9B illustrates an example case where a file (519) named "Content3.pdf" is submitted as additional data. At this time, the finalization identification information 908 indicates that content data is finalized simultaneously with additional content submission, and content resubmission is not approved.

A content submission response description unit 906 includes reply data to a content submission request, and includes information similar to the information included in content submission information unit 904. As an example, the content submission response description unit 906 includes a command character string indicating that the data is a response to a content submission command, a BusinessID for identifying a series of handled electronic data, and information indicating an orderer and a printing company involved in this order. FIG. 9B also illustrates an example of a Result indicating that requested content data is accepted and further content submission processing is performable.

A preflight result description unit 907 includes a result of preflight made by a printing business operator system. For example, the preflight result description unit 907 includes a file name 519 of content data subjected to preflight, and a preflight result 909.

FIG. 9C illustrates an example of data in the second content submission command 810 and the second response 811 to the second content submission command 810. The difference from the content submission command 806 illustrated in FIG. 9B will be mainly described below. As information included in the commands and the responses have already been described with reference to FIGS. 5A, 5B, 5C, 6A, and 6B, redundant description on issuance conditions and issuance statuses of the commands will be omitted.

A second content submission information unit 910 illustrated in FIG. 9C includes content resubmission designation information 910 indicating that the command corresponds to content resubmission processing on updating already-submitted data. FIG. 9C also illustrates an example in which a file to be resubmitted is the same as the file (519) including information finalized based on the finalization identification information 908, as described with reference to FIG. 9B.

A content submission response description unit 911 includes an execution result indicating that content resubmission was not accepted, and execution result detailed information 912 includes information regarding a reason for the rejection. In the system according to the present exemplary embodiment, the information included in the execution result detailed information 912 is assumed to be used when display control of information regarding the reason 705 in the detailed factor information presentation unit 704 as illustrated in FIG. 7B is performed.

FIGS. 10A to 10C illustrate specific examples of preliminary processing for processes performed in a workflow internally operating after the printing business operator system 104 accepts submission of finalized data from the orderer system 101, and effects thereof.

FIG. 10A illustrates a relationship in dependency and order between content data and each process of a workflow in which the content data is processed. FIG. 10B illustrates an example of content data illustrated in FIG. 10A. FIG. 10B illustrates an example in which a final product (printed product) is generated from four parts, and content data is provided for each part. FIG. 10C illustrates a specific example of processing to be performed in each process illustrated in FIG. 10A. An effect to be obtained by performing preliminary processing of each process included in a workflow with the printing business operator system 104 that can determine that submitted content data is finalized in producing a product from the content data will be described below using the examples illustrated in FIGS. 10A to 10C.

The example illustrated in FIGS. 10A to 10C indicates an example case where a single product includes four pieces of content data. The example illustrated in FIGS. 10A to 10C also indicates an example case where a bound product is generated as a final product 1012 from these four pieces of content data.

FIG. 10B illustrates that content data 1 (1001) is an example of data to be used as image information about a part corresponding to the cover of the final product 1012. FIG. 10B similarly illustrates that content data 2 (1002) is an example of data to be used for forming pages of a document part in a body text of the bound product as the final product 1012. Furthermore, FIG. 10B similarly illustrates that content data 3 (1003) is an example of data to be used in forming color photograph pages of the body text of the bound product, and content data 4 (1004) is an example of data to be used in forming color figure pages of the body text of the bound product.

FIG. 10C illustrates an example in which a single product is generated from a plurality of content data pieces having different purposes and properties. Hereinafter, work processes (i.e., processes in a workflow) through which the final product 1012 is generated from the plurality of different content data pieces will be described.

A process 1 (1005) is a prepress process for performing color management system (CMS) processing for the cover. The cover is an example of a case where a feature color is used in addition to CMYK four process colors, and CMS processing considering the feature color is performed in the process 1 (1005). On the other hand, CMS processing in a process 4 (1008) is a prepress process for performing CMS processing using the CMYK four process colors not including any feature color. Thus, the process 1 (1005) and the process 4 (1008) are different from each other because data to be applied and a color space to be processed are different even if CMS processing is performed in both of the processes. Among the content data pieces excluding the content data 1 (1001) as the data for the cover, two files corresponding to content data 3 (1003) and the content data 4 (1004), which are color content data pieces, are to be processed in the process 4 (1008). FIG. 10C illustrates that the content data 3 (1003) and the content data 4 (1004) thus are used in preliminarily processing the process 4 (1008).

As described in the description of the process 1 (1005) and the process 4 (1008), content data, intermediate data, or an intermediate product to be processed in each process in a workflow are input data as processing targets, and after processing defined for the process is performed, a processing result of the process is generated as an output.

The generated output is new intermediate data or an intermediate product. The workflow has a configuration in which processing is performed in a linked manner by inputting the generated output to the next process.

As described above with reference to FIGS. 10A and 10C, a plurality of processes has an order and dependence relationship. The processing is linked by inputting data, intermediate data, or a product to a subsequent process. The final product 1012 can be obtained by completing the processing in a process 7 (1011) as a final process.

Effects to be caused by the system according to the present exemplary embodiment will be described below. As illustrated in FIGS. 10A to 10C, a final product is consequently generated from a plurality of content data pieces through processing in the processes in a workflow in which a plurality of processes has an order and dependence relationship. This is a general method for generating a printed product such as a bound product in the printing business operator system 104.

As uses of these, it is known that an industry standard specification called JDF that defines the format of information used in forming a workflow is used, and that a system to which the JDF is applied performs the processing. In other words, the JDF is devised to effectively achieve such processing. In the system according to the present exemplary embodiment, the configuration for generating a final product through processing in the processes in a workflow, and an order and dependency linkage thereof is assumed to be made based on the workings of workflow control represented by JDF. The details of the workings of a JDF-based workflow system, and a configuration thereof will be omitted.

If the printing business operator system 104 recognizes content data being input data as finalized data, processing in each process configured to be processed using the content data as an input can be started. As illustrated in FIG. 10A, various processes are performed before a final product is obtained from content data pieces, and the processes mutually has a dependence relationship as illustrated in FIG. 10A.

If the printing business operator system 104 cannot start processing until all the content data pieces (1001, 1002, 1003, and 1004) used in forming a final product are input, production efficiency declines. Furthermore, even though all content data pieces are input, if the content data pieces are not finalized data, each process cannot start processing on content data. In other words, unless it can be determined that content data is finalized data, productivity cannot be enhanced by performing preliminary processing using content data in each process for processing the data. If content resubmission such as replacement of content data is performed after various types of processing are performed on unfinalized content data by processes for processing data, processing that has been performed become useless. Furthermore, intermediate data or an intermediate product as a partly-generated processing result is to be discarded, and resubmitted data is to be processed again.

For this reason, the present exemplary embodiment aims to ensure an advantage of productivity enhancement for the printing business operator system 104 that is caused by preliminary processing, and flexibility of content submission for the orderer system 101.

The example according to the present exemplary embodiment indicates that the content data pieces 2, 3, and 4 (1002, 1003, and 1004) are input to the process 2 (1006). In other words, the system according to the present exemplary embodiment is configured to preliminarily start processing in the process 2 (1006) in response to when the content data pieces 2, 3, and 4 (1002, 1003, and 1004) in the finalized state are input. A process 2 (1006) is a process for determining a spine width. The spine width is information to be used in the production of the cover in a process 6 (1009) and simultaneously with a result of the process 1 (1005). Thus, the process 6 (1009) can be started after the processing in both the process 1 (1005) and the process 2 (1006) becomes a completed state.

In other words, to preliminarily process the process 6 (1009), preliminary processing in the process 1 (1005) and the process 2 (1006) is completed. To complete the preliminary processing, the content data pieces 1, 2, 3, and 4 (1005, 1006, 1007, and 1008) being content data pieces used in the process 1 (1005) and the process 2 (1006) are submitted, and determined by the system to be finalized data. In other words, if the content data pieces 1, 2, 3, and 4 (1005, 1006, 1007, and 1008) are submitted and finalized, the system can perform preliminary processing up to the process 6 (1009).

In the example according to the present exemplary embodiment, the content data 2 (1002) is used as an input in the process 3 (1007). In other words, the system according to the present exemplary embodiment is configured to preliminarily start the processing in the process 3 (1007) in response to when the content data 2 (1002) in the finalized state is submitted.

A process 5 (1010) is a process for producing parts corresponding to a bound product body text that constitute the final product 1012 excluding the cover. In other words, the example of the workflow according to the present exemplary embodiment indicates that processing in the process 5 (1010) can be started after remaining information and intermediate products excluding content data related to the cover and a result of the accompanying process processing are all input.

As illustrated in FIG. 10A, a start condition of the process 5 (1010) is the input of all the intermediate data or intermediate products being processing results of the processes 2, 3, and 4 (1006, 1007, and 1008) processed prior to the process 5 (1010). To start the processing in the process 5 (1010), preliminary processing in the processes 2, 3, and 4 (1006, 1007, and 1008) is completed, and the content data pieces 2, 3, and 4 (1002, 1003, and 1004) illustrated in FIG. 10A that have been respectively input to these processes are submitted in the finalized state.

In other words, if the content data pieces 2, 3, and 4 (1002, 1003, and 1004) are submitted in the finalized state, the system can perform preliminary processing up to the process 5 (1010).

The process 7 (1011) is a process for generating a final product 1012 by combining intermediate products as results of the processes 5 and 6 (1010 and 1009).

The processing in the processes positioned previous to the process 7 (1011), the process generating results used in the processes, and conditions such as finalization of input content data are linked. By determining these, preliminary processing is automatically performed.

FIG. 11 illustrates an example of a content data management table 1100 for managing content data received by the second receiving program 408 with the content submission command (806, 810). The content data management table 1100 is managed by the workflow control program 411. The content data management table 1100 is generated, updated, and managed in the HDD 211 by the CPU 201 running the workflow control program 411.

As illustrated in FIG. 11, the content data management table 1100 includes a content data file management information field 1101 and a corresponding finalized information field 1102. The example illustrated in FIG. 11 indicates a state in which three content data pieces are submitted. More specifically, the three content data pieces are first content data 1103 (1001), second content data 1104 (1002), and third content data 1105 (1003). The example illustrated in FIG. 11 indicates that these content data pieces correspond to the content data pieces illustrated in the example illustrated in FIGS. 10A to 10C.

As illustrated in FIG. 11, values in the finalized information field 1102 for the first content data 1103 (1001) and the second content data 1104 (1002) indicate FALSE. In other words, these content data pieces are not in the finalized state. On the other hand, a value in the finalized information field 1102 for the third content data 1105 (1003) indicates TRUE. In other words, the data is in the finalized state.

In the present exemplary embodiment, the description has been given of an example in which information regarding a file not to be finalized (i.e., information indicating that the value in the finalized information field 1102 indicates FALSE) is also transmitted, but information regarding a file to be finalized (i.e., information indicating that the value in the finalized information field 1102 indicates TRUE) may be transmitted.

As already described above using the examples in illustrated FIGS. 5A, 5B, 5C, and 8, an operation such as content resubmission, so-called subsequent submission, or replacement submission that is to be subsequently performed on the same data is variably controlled depending on whether content data is finalized data.

Figure 12:
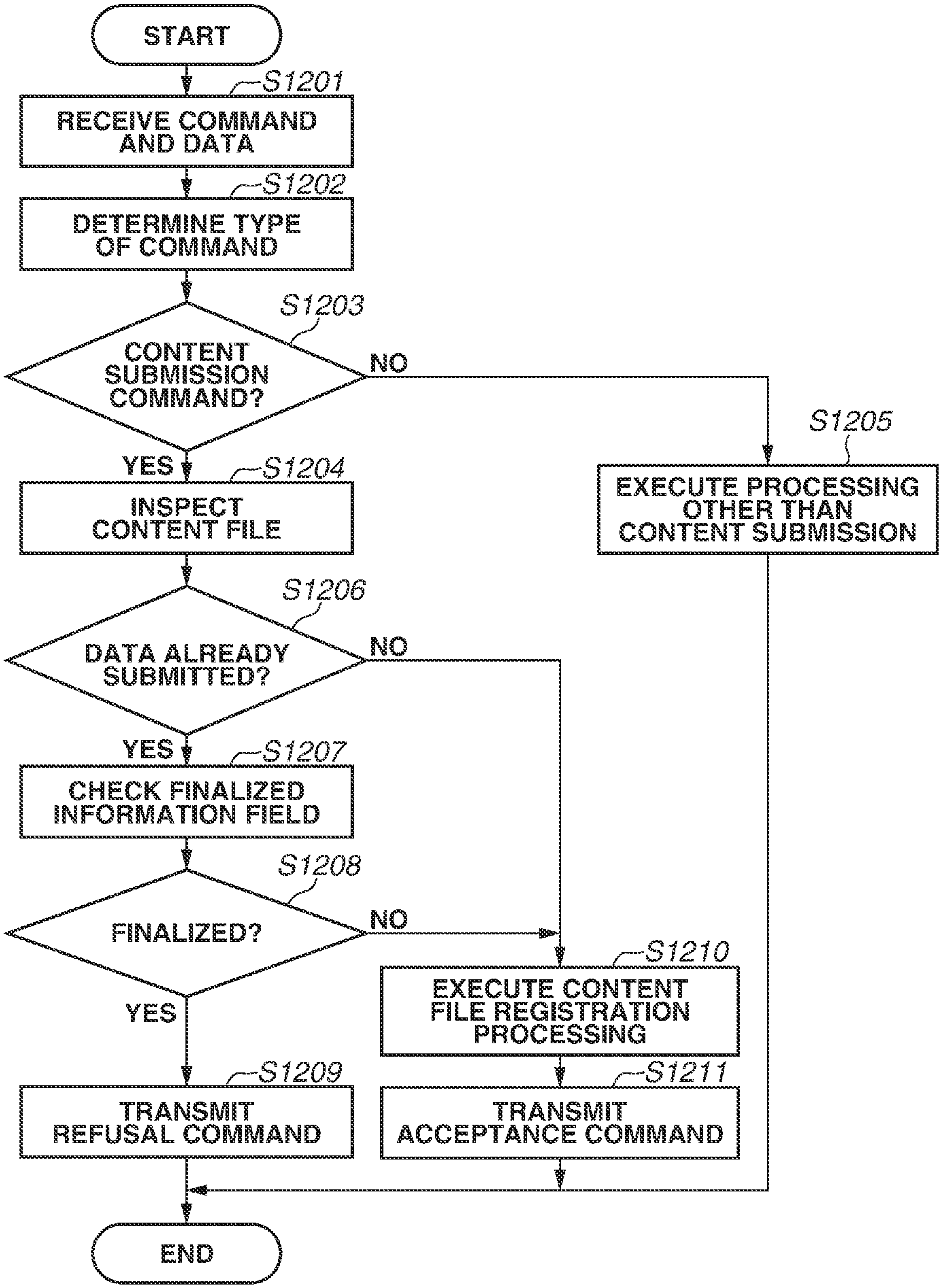
FIG. 12 illustrates an operation of a processing procedure of content data according to the first exemplary embodiment.

FIG. 12 is a flowchart mainly illustrating of an operation of the workflow control program 411 for performing processing of determining whether to accept or refuse content submission processing requested by an orderer. The processing in this flowchart is operated by the CPU 201 reading out the workflow control program 411 from the HDD 211 and running the workflow control program 411.

In step S1201, the workflow control program 411 receives commands and data transmitted from the orderer system 101. The commands and the data describe execution requests as exampled in FIGS. 9A, 9B, and 9C.

When any command and data is received from the orderer system 101, the processing proceeds to step S1202, and the type of the received command is determined.

In step S1203, the workflow control program 411 determines whether the type of the command received in step S1201 that has been determined in step S1202 is a content submission command (806, 810). If it is determined in step S1203 that the determined type is not a content submission command (NO in step S1203), the processing proceeds to step S1205. In step S1205, the workflow control program 411 executes various types of commands received in step S1201 other than the content submission command (806, 810) as illustrated in FIG. 8. Specific commands to be executed in step S1205, and the detailed operations will be omitted.

If it is determined in step S1203 that the determined type is a content submission command (YES in step S1203), this means that the command received in step S1201 is a content submission command (806, 810). The processing proceeds to step S1204. In step S1204, the workflow control program 411 inspects a content file submitted when the content submission command is received.

The inspection result is determined in step S1206 in the next step. Specifically, the workflow control program 411 determines whether content data received in step S1201 is already-submitted data. In other words, the workflow control program 411 determines in step S1206 whether content data received in step S1201 is used in content resubmission processing on already-submitted data.

If it is determined in step S1206 that received data is not already-submitted data (NO in step S1206) (i.e., if content data submitted with a content submission command (806, 810) received in step S1201 is new content data), the processing proceeds to step S1210.

On the other hand, if it is determined in step S1206 that received data is already-submitted data (YES in step S1206) (i.e., if content data submitted with a content submission command (806, 810) received in step S1201 is already-submitted data), the processing proceeds to step S1207.

In step S1210, the workflow control program 411 performs new registration processing on the content data submitted with a content submission command (806) received in step S1201. The processing in step S1210 will be described below.

If the processing in step S1210 is completed, the processing proceeds to step S1211. In step S1211, the workflow control program 411 transmits to the orderer system 101 a response (808) indicating information indicating that content submission processing requested using the content submission command (806) received in step S1201 has been accepted.

The processing to be performed in step S1207 corresponds to processing to be performed when it is determined in step S1206 that content data submitted with the content submission command (806, 810) received in step S1201 is already-submitted data. In this case, the workflow control program 411 checks the value in the finalized information field 1102 that is associated with the entry in the content data file management information field 1101 that corresponds to the submitted data in the content data management table 1100 illustrated in FIG. 11.

The value in the finalized information field 1102 that has been checked in step S1207 is determined in step S1208 as the next step.

A case where it is determined in step S1208 that the value in the finalized information field 1102 that is associated with the entry in the content data file management information field 1101 that corresponds to the submitted data indicates FALSE (NO in step S1208) corresponds to a case where submitted data is not finalized data. In this case, the system performs control in such a manner that data the same as unfinalized data can be submitted (i.e., content resubmission processing can be performed). The processing proceeds to step S1210, and the workflow control program 411 performs registration processing on the content data.

On the other hand, a case where it is determined in step S1208 that the value in the finalized information field 1102 that is associated with the entry in the content data file management information field 1101 that corresponds to the submitted data indicates TRUE (YES in step S1208) corresponds to a case where submitted data is finalized data. In this case, the system performs control in such a manner that data the same as finalized data cannot be submitted (i.e., content resubmission processing cannot be performed). The processing proceeds to step S1209. In step S1209, the workflow control program 411 transmits to the orderer system 101 a response (811) to the content submission command (810) that indicates information indicating that content submission was not accepted.

Figure 13:
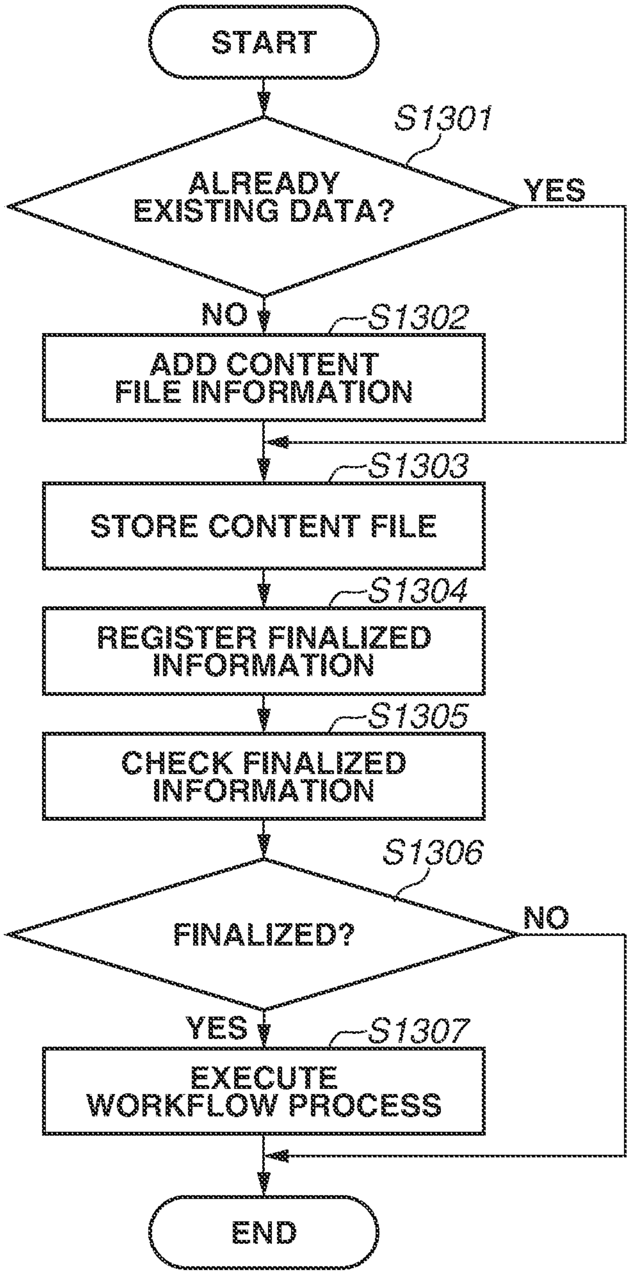
FIG. 13 illustrates the details of content file registration processing in a processing procedure of content data according to the first exemplary embodiment.

FIG. 13 is a flowchart illustrating the details of the content data registration processing performed in step S1210 of FIG. 12.

In step S1301, the workflow control program 411 determines whether data submitted with the content submission command (806, 810) is new data. In other words, the workflow control program 411 determines whether new content data is received, or the submitted data is used in content resubmission processing corresponding to replacement of already-submitted data.

If it is determined in step S1301 that no reception history of equivalent content data exists, and the submitted data is to be subjected to new content submission processing (NO in step S1301), the processing proceeds to step S1302. In step S1302, the workflow control program 411 adds an entry to the content data management table 1100 illustrated in FIG. 11.

If it is determined in step S1301 that data submitted with the content submission command (806) is already-submitted data (YES in step S1301), a new entry will not be added to the content data management table 1100 in step S1302, the processing in step S1302 is omitted.

In step S1303, the workflow control program 411 stores into the HDD 211 the data submitted with the content submission command (806) received in step S1201. The workflow control program 411 stores content file information such as a file name into a data storage entry for content data in the content data file management information field 1101 of the content data management table 1100. Subsequently, the processing proceeds to step S1304. In step S1304, the workflow control program 411 registers the value of the corresponding finalized information field 1102 based on information included in the received content submission command (806).

In step S1305, the workflow control program 411 checks the value in the finalized information field 1102 that is stored in step S1304, and determines the value in step S1306 as the next step.

If it is determined in step S1306 that the value in the finalized information field 1102 that has been checked in step S1305 indicates FALSE (NO in step S1306) (i.e., if it is determined that content data is not finalized), the procedure illustrated in FIG. 13 ends.

If it is determined in step S1306 that the value in the finalized information field 1102 that has been checked in step S1305 indicates TRUE (YES in step S1306) (i.e., if it is determined that content data is finalized), the processing proceeds to step S1307. In step S1307, the workflow control program 411 starts a process of a workflow in which preliminary processing can be performed using the content data in the finalized state as an input as illustrated in FIGS. 10A to 10C. This configuration allows the printing business operator system 104 to preliminarily start processing on finalized content data with a piece of content data determined to be processible. Performing control based on finalized information in content data makes it possible to perform preliminary processible, providing an enhanced efficiency with flexibility in production plan. When an orderer transmits content data to a printing business operator, the orderer can submit unfinalized data, and is also allowed to resubmit data. A printing business operator can determine that content data is finalized, and can preliminarily perform processes in a workflow for processing finalized content data.

A second exemplary embodiment will be described. In the present exemplary embodiment, the orderer system 101 can control whether content data submitted by a method different from that in the first exemplary embodiment is finalized, with respect to the printing business operator system 104.

Figure 14:
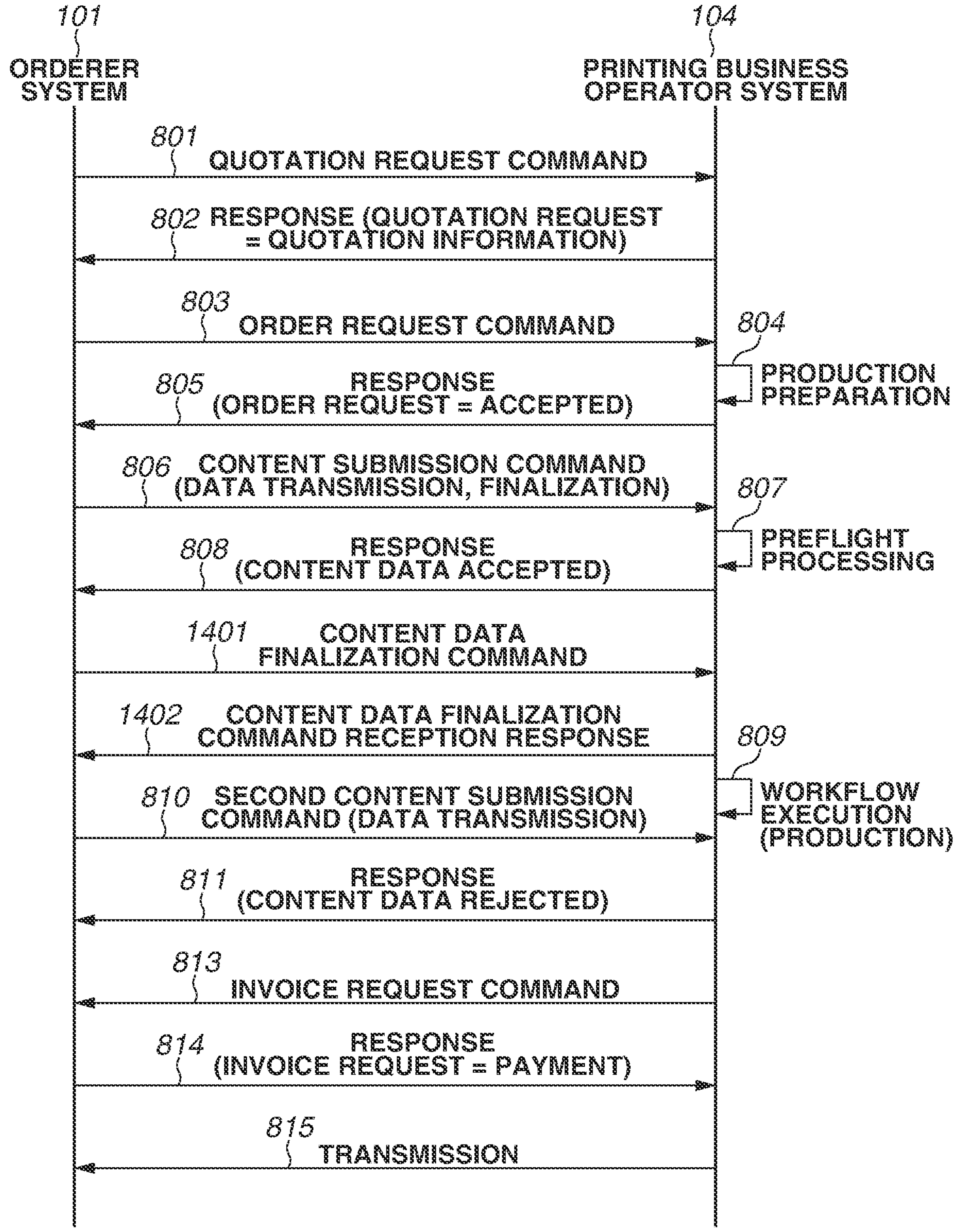
FIG. 14 is a sequence diagram illustrating information to be exchanged between first and second information processing apparatuses according to a second exemplary embodiment.

FIG. 14 illustrates a second sequence of content submission commands and responses that are to be exchanged between the orderer system 101 and the printing business operator system 104 according to the second exemplary embodiment. Hereinafter, the description will be given while focusing attention on the difference from the sequence illustrated in FIG. 8.

A submitted data finalization command 1401 is a control command for bringing data already submitted from the orderer system 101 to the printing business operator system 104 with the content submission command 806 into the finalized state using another command. In the first exemplary embodiment, the description has been given of an example of data for performing control in such a manner as to finalize content data based on the finalization identification information 908 included in the content submission command 806 as illustrated in FIGS. 9A, 9B, and 9C, and the system that performs control based on the data.

In the second exemplary embodiment, the description will be given of an example of a system that provides the submitted data finalization command 1401 as a command separated from the content submission command 806, and performs control for finalizing content data using the submitted data finalization command 1401.

Simultaneously with the return of a response 1402 made when the submitted data finalization command 1401 is received, the execution of the workflow is started in step 809.

This is because the printing business operator system 104 detects that submitted data is finalized, based on the submitted data finalization command 1401, and the workflow control program 411 performs control in such a manner as to start preliminary processing in the workflow illustrated in FIGS. 10A to 10C.

FIG. 15 illustrates an example of actual data in commands and responses to be transmitted and received between the orderer system 101 and the printing business operator system 104 according to the second exemplary embodiment.

A content submission finalization command 1501 according to the second exemplary embodiment does not include the finalization identification information 908 in the content submission command 806 according to the first exemplary embodiment. Instead, a system according to the second exemplary embodiment is configured to have equivalent effects using a content submission finalization command 1501 (1401). The content submission finalization command 1501 (1401) includes information regarding a file name 519 for indicating the data to be finalized, among submitted data pieces.

The system according to the second exemplary embodiment can perform finalization processing on content data using a command different from a content submission command. This configuration allows the following additional advantages that cannot be gained in the first exemplary embodiment to be given.

First of all, at the time point of content submission, an orderer can suspend the determination as to whether target content data is finalized. At the time point at which it is revealed that the content data is finalized, it is possible to transmit a finalization command at a later appropriate timing, and finalize the content data submitted earlier. This configuration provides a more flexible handling than in the first exemplary embodiment.

Secondly, a finalization command is separated from a content submission command, which allows a system or an operator that is different from a system that has issued the content submission command or an operator of the system to issue the finalization command as processing identified as content submission processing. This allows such as an operation under a condition that a content submission command issuer is a creator of content data, and that a finalization command issuer is a person responsible for an orderer system.

Thirdly, the command data format in which the finalization identification information 908 is included in a content submission command as in the first exemplary embodiment limits the issuance and execution of finalization processing as a command as the same processing as content submission processing. However, the separation of a finalization command from a content submission command as in the second exemplary embodiment is not limited to the case. Thus, the system according to the second exemplary embodiment can also use a method of uniformly finalizing a plurality of already-submitted data pieces using a single finalization command.

Figure 16:
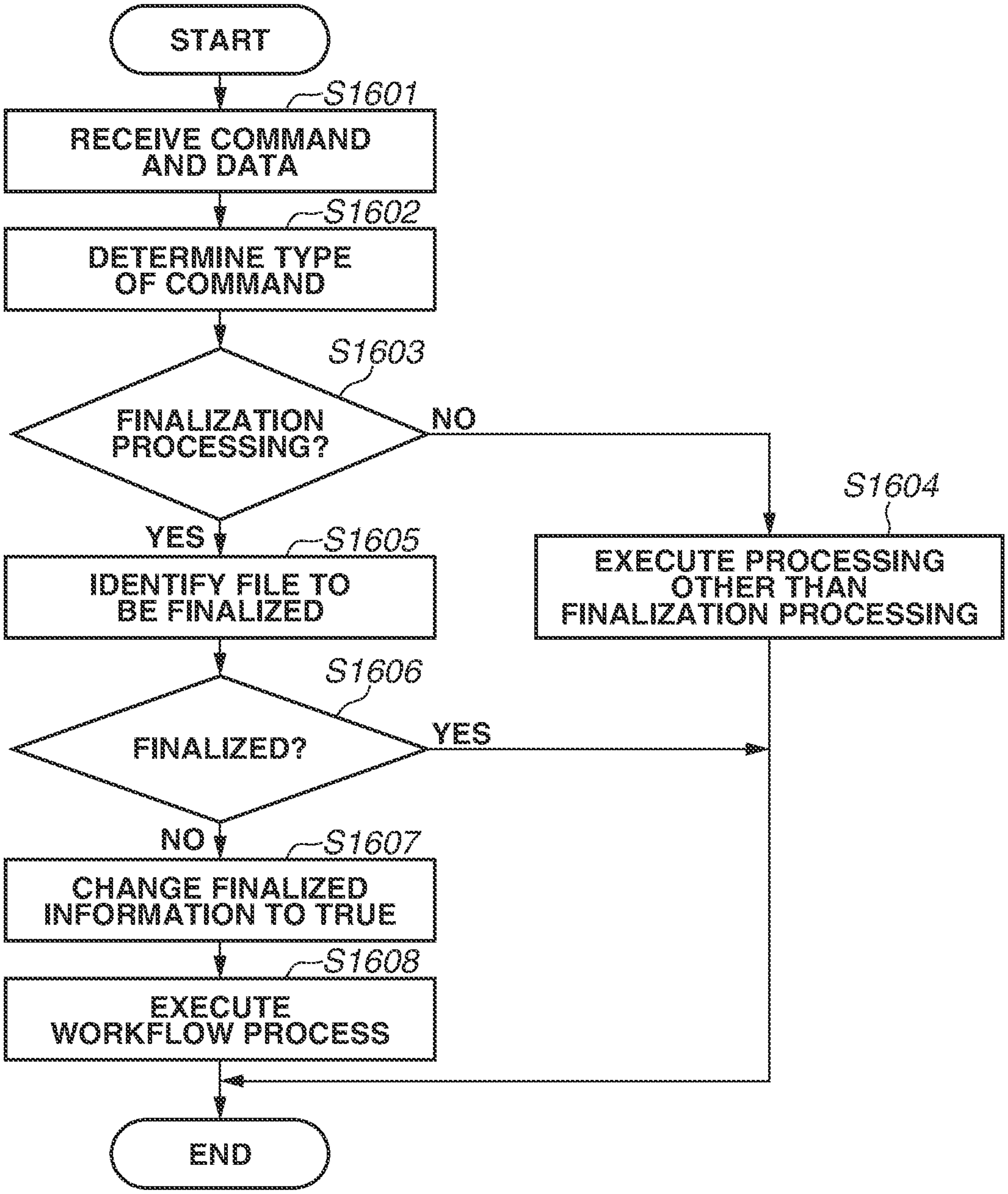
FIG. 16 illustrates an operation of a processing procedure of content data according to the second exemplary embodiment.

FIG. 16 is a flowchart mainly illustrating an operation of the workflow control program 411 according to the second exemplary embodiment for performing processing of determining whether to accept or refuse content submission processing requested by an orderer. The processing in this flowchart is operated by the CPU 201 reading out the workflow control program 411 from the HDD 211 and running the workflow control program 411. FIG. 16 corresponds to FIG. 12 in the first exemplary embodiment.

In step S1601, the workflow control program 411 receives a command execution request as exampled in FIG. 15 that is transmitted from the orderer system 101.

Command determination processing in step S1602 is equivalent to the processing in step S1202, and the detailed description will be omitted.

In step S1603, the workflow control program 411 determines whether the type of the command determined in step S1602 is the submitted data finalization command 1401. The operation and the sequence of the submitted data finalization command 1401, and the details of the data have already been described with reference to FIGS. 14 and 15.

If it is determined in step S1603 that the command is not the submitted data finalization command 1401 (NO in step S1603), the processing proceeds to step S1604. In step S1604, the workflow control program 411 performs execution processing of commands other than the submitted data finalization command 1401. The details of the execution processing of commands other than the submitted data finalization command 1401 will be omitted.

On the other hand, if it is determined in step S1603 that the command is the submitted data finalization command 1401 (YES in step S1603), the workflow control program 411 performs processing in step S1605 and subsequent steps.

In step S1605, the workflow control program 411 identifies a file to be finalized that is included in the received submitted data finalization command 1401. Specifically, the workflow control program 411 identifies the entry in the content data management table 1100 illustrated in FIG. 11, based on the file name 519 illustrated in FIG. 15.

In step S1606, the workflow control program 411 performs determination processing based on the value in the finalized information field 1102 of the entry in the content data management table 1100 that has been identified in step S1605. More specifically, if it is determined based on the file name 519 that the value in the finalized information field 1102 of the entry in the content data management table 1100 is TRUE (YES in step S1606), the value means a request for additional finalization processing on finalized content data. Finalization processing in this case makes no sense, and the workflow control program 411 ends the processing in this flowchart without performing any processing.

On the other hand, if it is determined that the value in the finalized information field 1102 of the entry in the content data management table 1100 is FALSE (NO in step S1606), the value means that a request for finalization processing on unfinalized content data is received with the submitted data finalization command 1401. The processing thus proceeds to step S1607. In step S1607, the workflow control program 411 changes the value in the finalized information field 1102 included in the entry corresponding to the file name 519 in the content data management table 1100, to TRUE (i.e., finalized state). Then, in step S1608, the workflow control program 411 starts the process processing of the workflow.

The above description has been given of the configuration according to the second exemplary embodiment that enables preliminary processing by finalizing submitted data using a content data finalization command provided for content data separately from a content submission command, and starting processing in processes of a workflow, and the implementation form of the technique.

Modified Example 1

A flag indicating whether preliminary processing is executable is added to content data.

In the first and second exemplary embodiments, the following system is employed.

More specifically, the system is a system in which the orderer system 101 conveys a message indicating that content data is finalized using finalization information included in a content submission command or a finalization instruction command for submitted data, to the printing business operator system 104.

The printing business operator system 104 can thereby determine that the submitted data is finalized. Thus, the technique is a technique that enables processing to be preliminarily performed with settings preset for the processes of a workflow provided for production. However, a workflow and processes included in the workflow are closed in the printing business operator system 104. Thus, processes, the order of the processes, and a dependence relationship therebetween are not obvious to the orderer system 101 as an external system.

While the execution of preliminary processing on content data finalized under such a condition is beneficial to the printing business operator system 104 intended to enhance productivity, the execution is not always beneficial to the orderer system 101. Some orderers might desire to permit the printing business operator system 104 to perform preliminary processing on finalized content data when a processing process of a workflow is agreed or visualized.

A system according to Modified Example 1 is a system for dealing with such a case. More specifically, the system includes a unit for setting information indicating whether to permit execution of preliminary processing on content data when the orderer system 101 transmits the content data to the printing business operator system 104, and a unit for determining the set information.

These units make it possible to provide a system that can perform variable control in such a manner as to permit or not permit preliminary processing on specific data as finalized content data.

As described above, some exemplary embodiments of the present disclosure have been described in detail, but the present disclosure is not limited to the specific exemplary embodiments. Various modifications and changes can be made within the scope of the present disclosure.

According to the above-described exemplary embodiments, it is possible to provide a system of order receipt/placement work highly convenient for both a user (i.e., orderer) and an order receiver. In other words, it is possible to satisfy both convenience of an orderer that performs content submission processing a plurality of times at a timing different from order placement processing and efficient workflow processing performed by a printing business operator that efficiently carries on undertaken production of printed products. This provides a practical and efficient electronic order receipt/placement system of printed products while satisfying both the demand from an orderer and the demand from a printing business operator as far as possible.

According to the above-described exemplary embodiment, a system that can transmit content data after order placement allows a printing business operator to determine whether content data is finalized.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-167323, filed Oct. 12, 2021, which is hereby incorporated by reference herein in its entirety.

What is claimed is:

1. An information processing apparatus comprising:
- one or more processors; and
- at least one memory storing one or more programs including executable instructions, which when executed by the one or more processors, cause the one or more processors to function as:
  - a receiving unit configured to receive order data for a printed product, and content data for the order data from an external device;
  - a control unit configured to perform control in such a manner as to perform production of the printed product; and
  - a registration unit configured to perform new submission registration processing on the received content data in a case where the received content data is newly submitted, and perform resubmission registration processing on the received content data in a case where the received content data is resubmitted data for already-submitted data,
  - wherein the receiving unit further receives finalized information about the content data from the external device,
  - wherein the registration unit does not perform the resubmission registration processing in a case where the received content data is resubmitted data for already-submitted data which is indicated to be finalized by the finalized information and performs the resubmission registration processing in a case where the received data is resubmitted data for already-submitted data which is not indicated to be finalized by the finalized information, and
  - wherein the control unit performs control in such a manner as to perform production of the printed product based on the order data, the content data and the finalized information about the content data.

2. The information processing apparatus according to claim 1,
- wherein the receiving unit receives new content data for the order data, and
- wherein the control unit controls whether to use the new content data in production of the printed product, based on the finalized information.

3. The information processing apparatus according to claim 1, wherein the control unit controls a process of a workflow for performing production of the printed product, based on the finalized information.

4. The information processing apparatus according to claim 1, wherein the control unit performs control in such a manner as to perform production of the printed product after the finalized information is received.

5. The information processing apparatus according to claim 1,
- wherein the printed product includes a plurality of parts, and
- wherein the receiving unit receives content data for each of the parts.

6. A control method for an information processing apparatus, the control method comprising:
- receiving order data for a printed product;
- receiving content data for the order data from an external device;
- performing new submission registration processing on the received content data in a case where the received content data is newly submitted, and perform resubmission registration processing on the received content data in a case where the received content data is resubmitted data for already-submitted data;
- receiving finalized information about the content data from the external device, wherein the resubmission registration processing is not performed in a case where the received content data is resubmitted data for already-submitted data which is indicated to be finalized by the finalized information and the resubmission registration processing is performed in a case where the received data is resubmitted data for already-submitted data which is not indicated to be finalized by the finalized information; and
- performing control in such a manner as to perform production of the printed product based on the order data, the content data, and the finalized information about the content data.

7. The control method according to claim 6, further comprising:
- receiving new content data for the order data; and determining whether to use the new content data in production of the printed product, based on the finalized information.

8. The control method according to claim 6, wherein the performing control controls a process of a workflow for performing production of the printed product, based on the finalized information.

9. The control method according to claim 6, wherein the performing control performs control in such a manner as to perform production of the printed product after the finalized information is received.

10. The control method according to claim 6, wherein the printed product includes a plurality of parts, and wherein the receiving of the content data receives content data for each of the parts.

11. A non-transitory computer-readable storage medium storing one or more programs including executable instructions, which when executed by one or more processors of the information processing apparatus, cause the information processing apparatus to perform the control method according to claim 6.

* * * * *